(12) United States Patent
Kim et al.

(10) Patent No.: US 12,236,075 B2
(45) Date of Patent: Feb. 25, 2025

(54) ELECTRONIC DEVICE INCLUDING FLEXIBLE DISPLAY AND OPERATING METHOD THEREOF

(71) Applicant: Samsung Electronics Co., Ltd., Suwon-si (KR)

(72) Inventors: Jiwon Kim, Suwon-si (KR); Yujin Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/364,228

(22) Filed: Aug. 2, 2023

(65) Prior Publication Data

US 2023/0376188 A1 Nov. 23, 2023

Related U.S. Application Data

(63) Continuation of application No. PCT/KR2023/005229, filed on Apr. 18, 2023.

(30) Foreign Application Priority Data

Apr. 19, 2022 (KR) ........................ 10-2022-0048389
Jun. 8, 2022 (KR) ........................ 10-2022-0069641

(51) Int. Cl.
*G06F 3/04845* (2022.01)
*G06F 1/16* (2006.01)

(52) U.S. Cl.
CPC ........ *G06F 3/04845* (2013.01); *G06F 1/1624* (2013.01); *G06F 1/1652* (2013.01)

(58) Field of Classification Search
None
See application file for complete search history.

(56) References Cited

U.S. PATENT DOCUMENTS

| 10,051,188 B2 | 8/2018 | Nagano et al. |
| 10,216,398 B2 | 2/2019 | Woo et al. |
| 11,244,658 B1 | 2/2022 | Hong et al. |

(Continued)

FOREIGN PATENT DOCUMENTS

| CN | 108076292 A | 5/2018 |
| CN | 111601042 A | 8/2020 |

(Continued)

OTHER PUBLICATIONS

International Search Report dated Jul. 24, 2023, issued in International Patent Application No. PCT/KR2023/005229.

*Primary Examiner* — Tuan S Nguyen
(74) *Attorney, Agent, or Firm* — Jefferson IP Law, LLP

(57) ABSTRACT

An electronic device is provided. The electronic device includes a camera, a flexible display having a display region with a changeable size, and a processor configured to display an image obtained via the camera in a first region of the display region, display at least a part of control objects related to the camera in a second region different from the first region, in case that reduction of the display region is detected, compare a size of the reduced display region to a size of the image, and display the image in the reduced display region while maintaining an aspect ratio and the size of the image such that at least a part of the control objects related to the camera overlaps the image displayed in the reduced display region.

20 Claims, 18 Drawing Sheets

(56) References Cited

U.S. PATENT DOCUMENTS

| | | | |
|---|---|---|---|
| 11,410,583 B2* | 8/2022 | Kim | G09G 3/20 |
| 2016/0057356 A1* | 2/2016 | Nagano | G09G 3/003 |
| | | | 348/333.06 |
| 2016/0112667 A1 | 4/2016 | Park et al. | |
| 2016/0306534 A1 | 10/2016 | Woo et al. | |
| 2016/0373654 A1 | 12/2016 | Kwon et al. | |
| 2021/0389873 A1 | 12/2021 | Chen et al. | |
| 2022/0303476 A1* | 9/2022 | Jang | H04N 5/2628 |
| 2022/0319009 A1* | 10/2022 | Choi | H04M 1/72454 |
| 2023/0130358 A1 | 4/2023 | Choi et al. | |

FOREIGN PATENT DOCUMENTS

| | | |
|---|---|---|
| JP | 6305138 B2 | 10/2015 |
| KR | 10-2016-0123620 A | 10/2016 |
| KR | 10-2016-0150539 A | 12/2016 |
| KR | 10-2017-0062121 A | 6/2017 |
| KR | 10-2091602 B1 | 3/2020 |
| KR | 10-2021-0089377 A | 7/2021 |
| KR | 10-2289369 B1 | 8/2021 |
| KR | 10-2289412 B1 | 8/2021 |
| KR | 10-2022-0008739 A | 1/2022 |
| WO | 2021/049675 A1 | 3/2021 |

\* cited by examiner

ELECTRONIC DEVICE INCLUDING FLEXIBLE DISPLAY AND OPERATING METHOD THEREOF

CROSS-REFERENCE TO RELATED APPLICATION(S)

This application is a continuation application, claiming priority under § 365(c), of an International application No. PCT/KR2023/005229, filed on Apr. 18, 2023, which is based on and claims the benefit of a Korean patent application number 10-2022-0048389, filed on Apr. 19, 2022, in the Korean Intellectual Property Office, and of a Korean patent application number 10-2022-0069641, filed on Jun. 8, 2022, in the Korean Intellectual Property Office, the disclosure of each of which is incorporated by reference herein in its entirety.

TECHNICAL FIELD

The disclosure relates to an electronic device including a flexible display and an operation method thereof.

BACKGROUND ART

Electronic devices are getting slimmer and are improving to emphasize the design and differentiate the functional elements. Such electronic devices have been gradually transformed from a uniform rectangular shape to various shapes. In addition, electronic devices may have a transformable structure capable of adjusting a display size so as to satisfy the portability and usability thereof. For example, an electronic device may have a structure (e.g., a rollable structure or a slidable structure) allowing a display area of a display to be changed by support of housings that slide with respect to each other.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

An electronic device may include a rollable electronic device (or a slidable electronic device) having an expandable and/or reducible display area of a display. For example, a display with an expandable and/or reducible display area may indicate a flexible display (or an expandable display or a stretchable display).

A rollable electronic device may include a first housing and a second housing which are coupled to be movable to each other by being at least partially fitted together. The rollable electronic device may change (e.g., expand or reduce) a display area of a flexible display supported by the first housing and the second housing according to sliding of the first housing and the second housing with respect to each other. For example, the flexible display may have a first display area, based on a slide-in state between the first housing and the second housing. The flexible display may have a second display area greater than the first display area, based on a slide-out state between the first housing and the second housing.

The rollable electronic device may display an image (e.g., a preview image) obtained via a camera, on the flexible display. The rollable electronic device requires a method for displaying the image (e.g., a preview image) obtained via the camera, based on a change of the display area of the flexible display.

Aspects of the disclosure are to address at least the above-mentioned problems and/or disadvantages and to provide at least the advantages described below. Accordingly, an aspect of the disclosure is to provide a device and a method for displaying an image (e.g., a preview image) obtained via a camera, based on a change of a display area of a flexible display in an electronic device.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a camera, a first housing, a second housing slidably coupled to the first housing, a flexible display being supported by the first housing and the second housing and having a display region with a changeable size, and at least one processor operatively connected to the camera and the flexible display and being configured to display an image obtained via the camera in at least a part of the display region of the flexible display, in response to detecting a reduction of the display region of the flexible display, compare a size of the reduced display region of the flexible display to a size of the image, and based on a result of the comparing, display the image in the reduced display region of the flexible display while maintaining an aspect ratio and the size of the image such that control objects related to the camera overlap the image displayed in the reduced display region of the flexible display.

In accordance with another aspect of the disclosure, a method of operation of an electronic device including a flexible display having a changeable display area is provided. The method includes displaying an image obtained via a camera of the electronic device in at least a part of a display region of the flexible display, in response to detecting a reduction of the display region of the flexible display, comparing a size of the reduced display region of the flexible display to a size of the image, and based on a result of the comparing, displaying the image in the reduced display region of the flexible display while maintaining an aspect ratio and the size of the image such that control objects related to the camera overlap the image displayed in the reduced display region of the flexible display.

In accordance with another aspect of the disclosure, an electronic device is provided. The electronic device includes a camera, a first housing, a second housing slidably coupled to the first housing, a flexible display being supported by the first housing and the second housing and having a display region with a changeable size, and at least one processor operatively connected to the camera and the flexible display and being configured to display an image obtained via the camera in the display region of the flexible display, in response to detecting a reduction of the display region of the flexible display, detect a main object in the image displayed in the display region, and based on the main object detected in the image, display a part of the image in the reduced display region of the flexible display while maintaining an aspect ratio and a size of the image.

Advantageous Effects of Invention

According to various embodiments of the disclosure, an electronic device may adaptively control a scheme of displaying an image (e.g., a preview image) obtained via a camera, based on a change of a display area of a flexible display, thereby improving the experience of a user using the electronic device including the flexible display.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
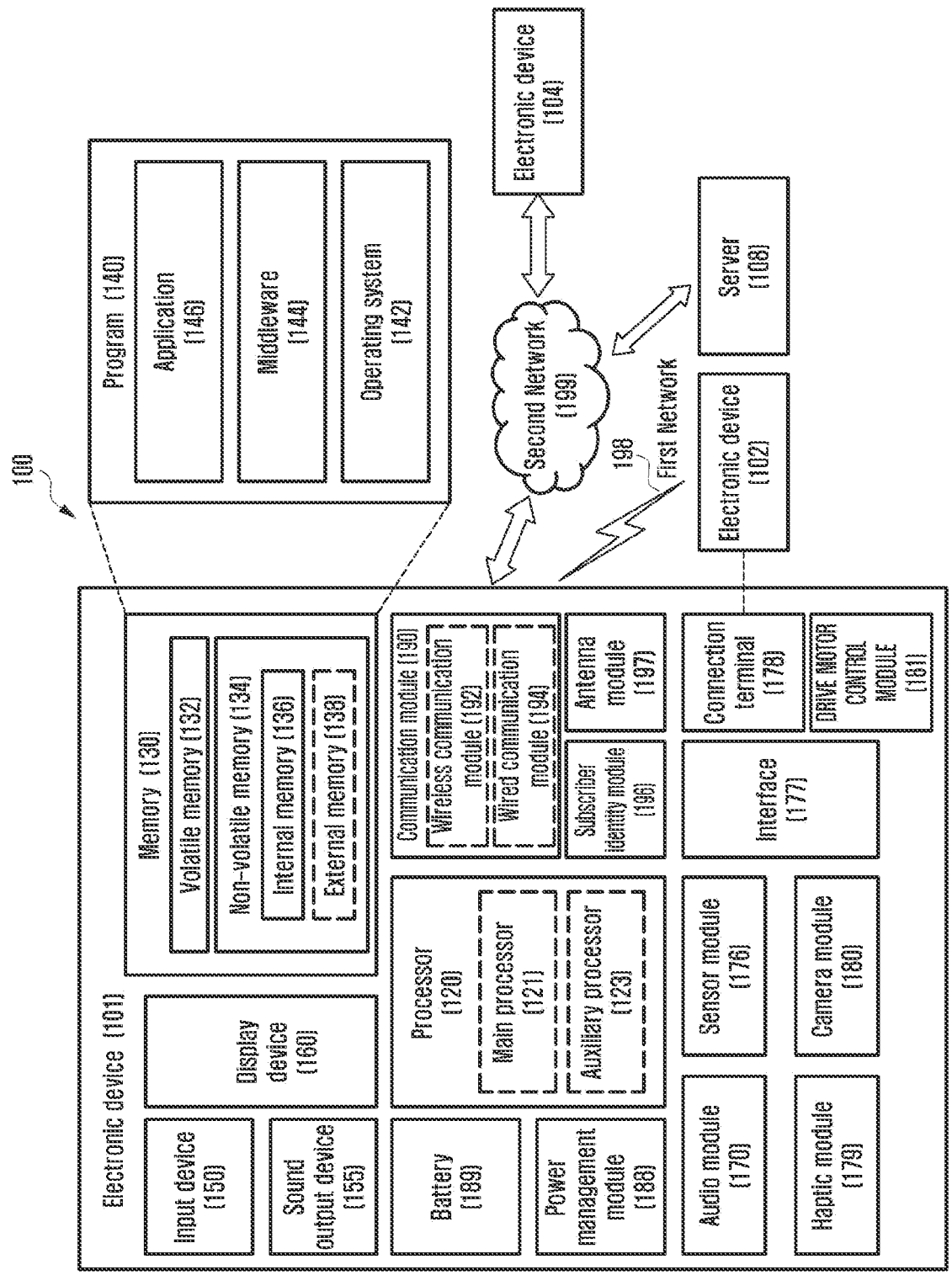
FIG. 1 is a block diagram of an electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module (e.g., input device 150), a sound output module (e.g., sound output device 155), a display module (e.g., display device 160), an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display device 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, a key (e.g., a button), or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. According to an embodiment, the subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna.

According to various embodiments, the sensor module 176 may include a movement distance detection sensor for detecting a movement distance of a first housing (e.g., a first housing 210 in FIG. 2A) from a second housing (e.g., second housing 220 in FIG. 2A) of the electronic device 101. According to an embodiment, the sensor module 176 may detect a slide-in state or a slide-out state of the first housing 210 relative to the second housing 220, or a moving state corresponding to a push-pull section, as a triggering operation for sliding. In an embodiment, the processor 120 may detect in real time a movement distance via the sensor module 176 while the first housing 210 (or the second housing 220) is moved from the second housing 220 (or the first housing 210), and also control the display device 160 to display an object corresponding to a changing display area via a display (e.g., a flexible display 230 in FIG. 2A).

According to an embodiment, the electronic device 101 may include a drive motor control module 181 for controlling an operation of a drive module (e.g., a drive motor 260 in FIG. 4) disposed in the electronic device 101. For example, in a state where the drive module is not in operation, in a case where a movement distance detected by a movement of the first housing 210 corresponds to a push-pull section (e.g., a designated movement distance or a triggering section), the processor 120 may operate the drive module via the drive motor control module 181 to change to a state where the first housing 210 has been slid into the second housing 220 or has been slid out of the second housing 220. In an embodiment, the drive motor control module 181 may be replaced with the processor 120.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 and 104 or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
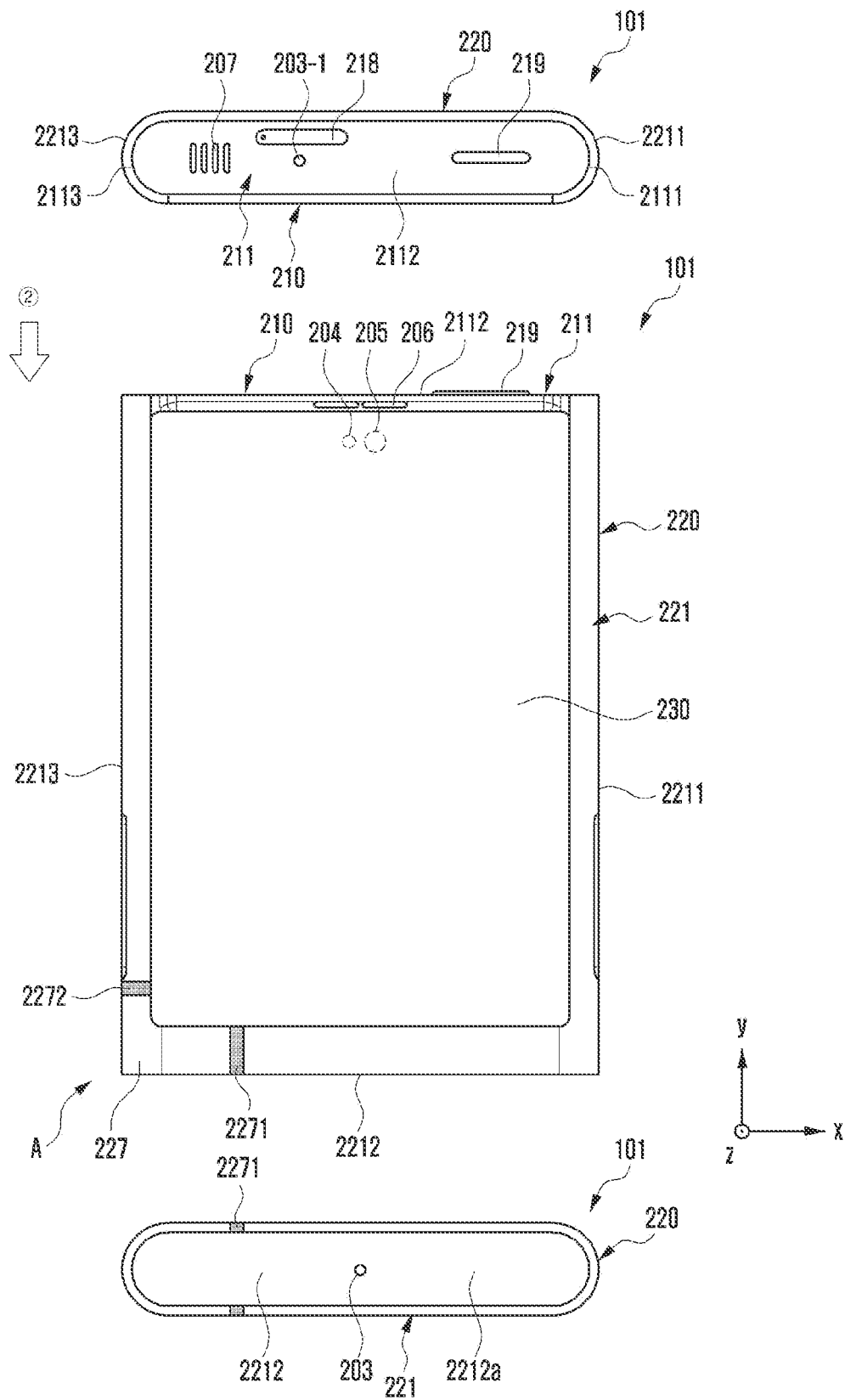
FIG. 2A is a diagram illustrating a front surface of an electronic device in a slide-in state according to an embodiment of the disclosure.
Figure 2B:
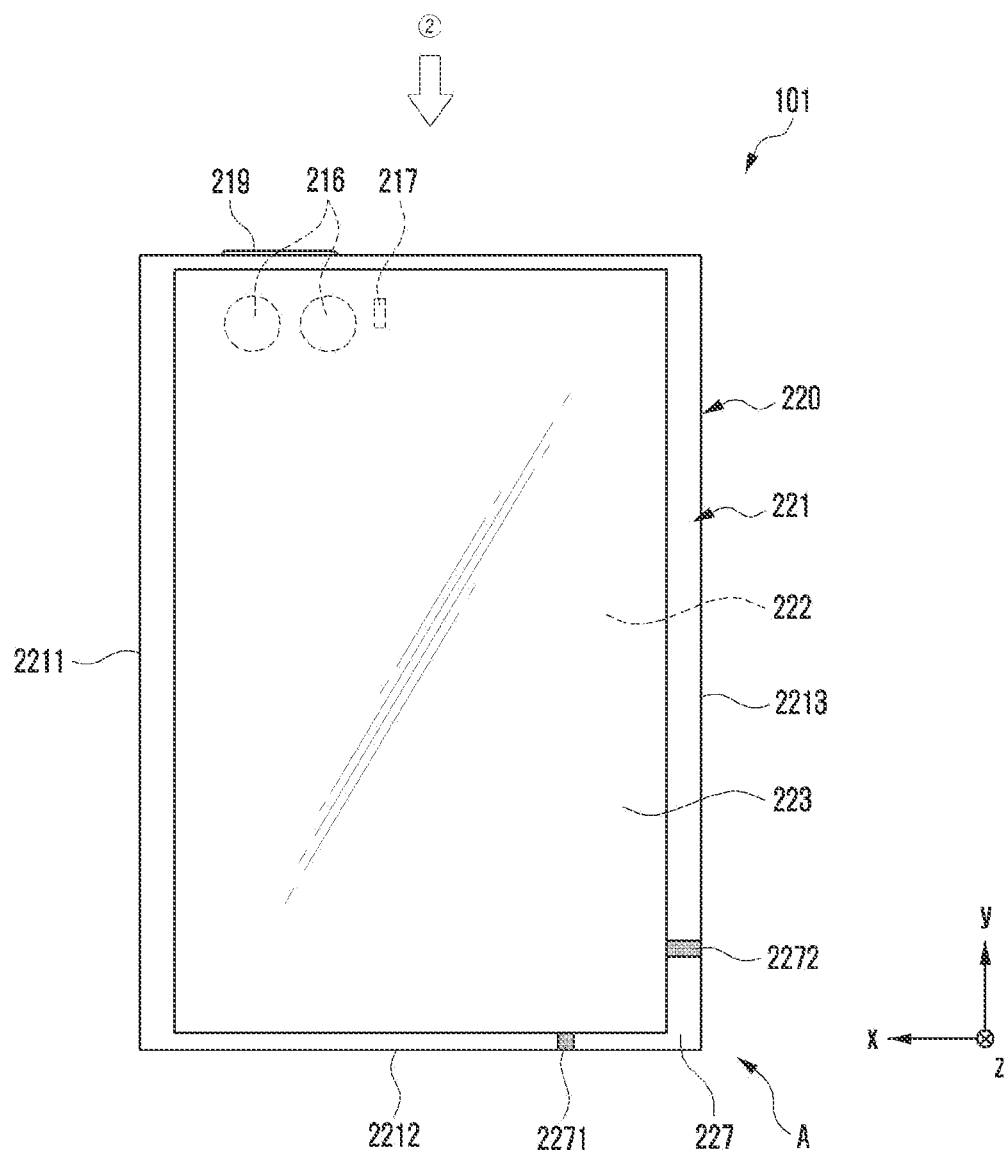
FIG. 2B is a diagram illustrating a rear surface of an electronic device in a slide-in state according to an embodiment of the disclosure.

FIG. 2A is a diagram illustrating a front surface of an electronic device in a slide-in state according to an embodiment of the disclosure. FIG. 2B is a diagram illustrating a rear surface of an electronic device in a slide-in state according to an embodiment of the disclosure.

Figure 3A:
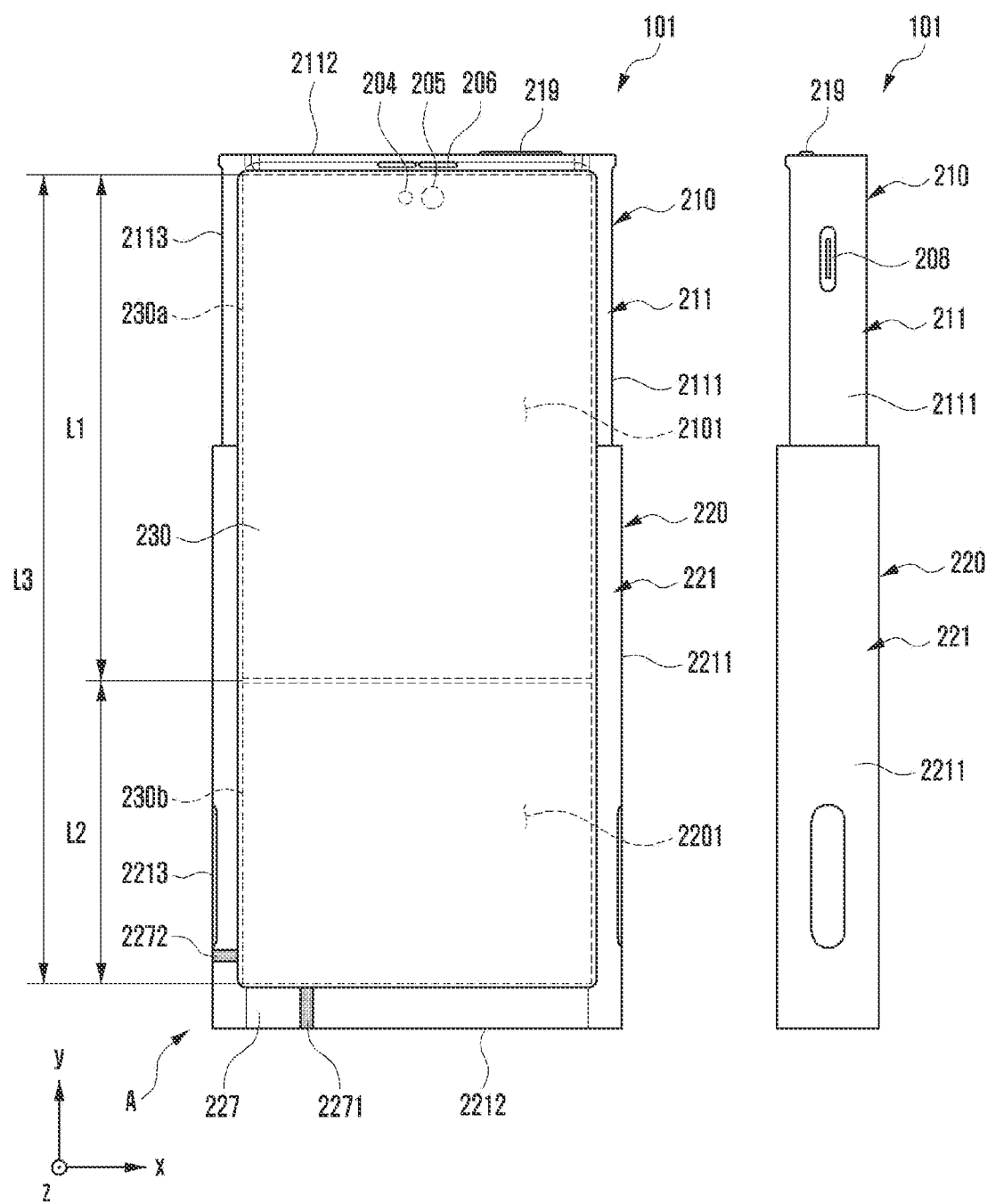
FIG. 3A is a diagram illustrating a front surface of an electronic device in a slide-out state according to an embodiment of the disclosure.
Figure 3B:
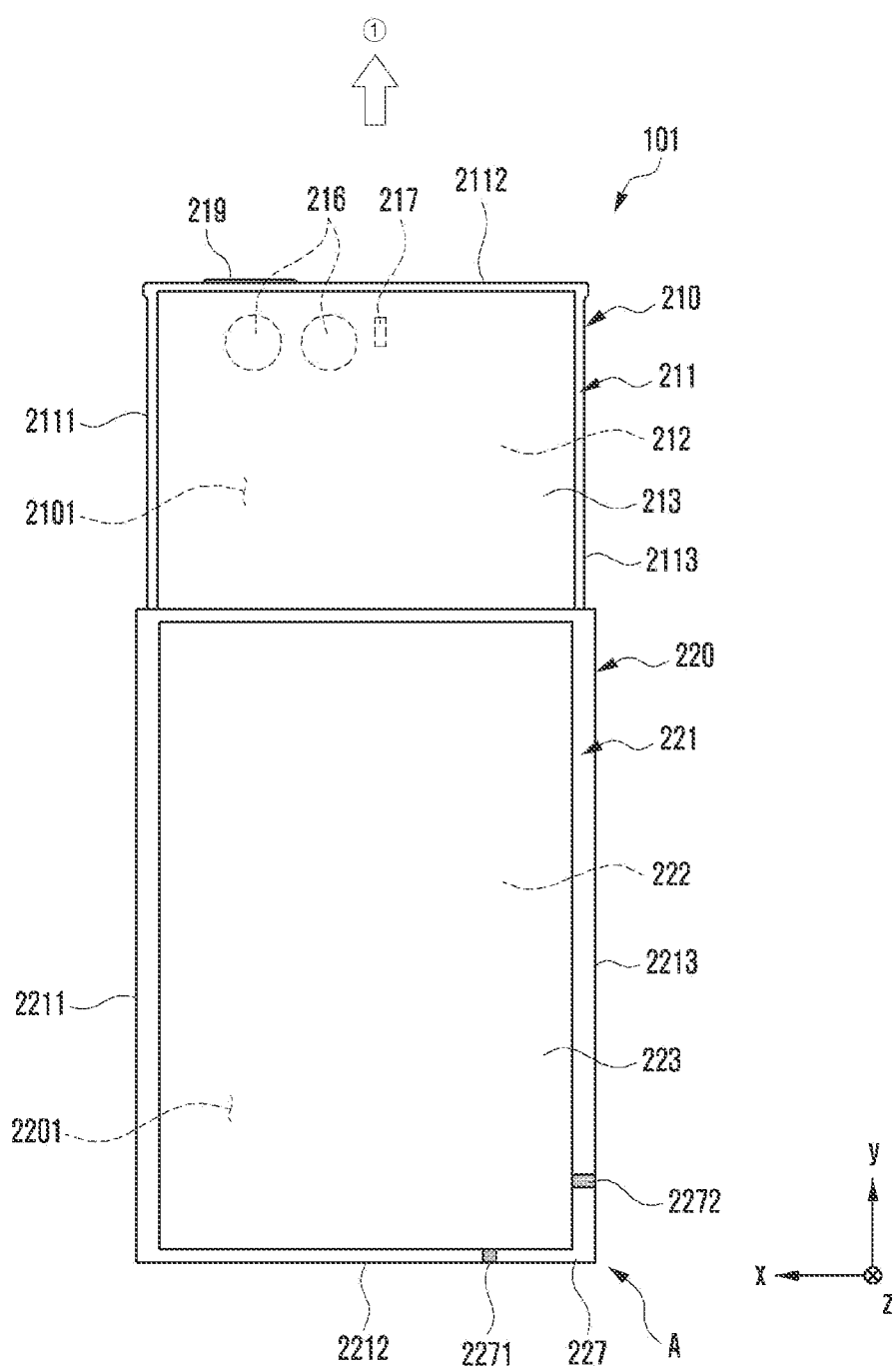
FIG. 3B is a diagram illustrating a rear surface of an electronic device in a slide-out state according to an embodiment of the disclosure.

FIG. 3A is a diagram illustrating a front surface of an electronic device in a slide-out state according to an embodiment of the disclosure. FIG. 3B is a diagram illustrating a rear surface of an electronic device in a slide-out state according to an embodiment of the disclosure.

Referring to FIGS. 2A, 2B, 3A, and 3B, the electronic device 101 may include the first housing 210 (e.g., a first housing structure, a movable part, first housing part, or a slide housing), the second housing 220 (e.g., a second housing structure, a fixed part, second housing part, or a base housing) coupled the first housing 210 to be slidable in a designated direction (e.g., direction ① or direction ②) (e.g. ±y-axis direction), and the flexible display 230 (e.g., an expandable display or a stretchable display) disposed to be supported through at least a part of the first housing 210 and the second housing 220. According to an embodiment, the electronic device 101 may be configured such that the first housing 210 is slid out in a first direction (direction ①) or is slid in along a second direction (direction ②) opposite to the first direction (direction ①) with respect to the second housing 220 held by a user. According to an embodiment, at least a part of the first housing 210 including a first space 2101 may be accommodated in a second space 2201 of the second housing 220 so as to change to a slide-in state (e.g., retracted position). According to an embodiment, the electronic device 101 may include a bendable member (or a bendable support member) (e.g., a bendable member 240 in FIG. 4) (e.g., a multi-joint hinge module or a multi-bar assembly) that at least partially configures the same plane as at least a part of the first housing 210 in a slide-out state (e.g., extended position), and is at least partially accommodated in the second space 2201 of the second housing 220 in a slide-in state. According to an embodiment, at least a part of the flexible display 230 may be, in a slide-in state, accommodated in the inner space (e.g., second space 2201) of the second housing 220 while being supported by the bendable member (e.g., the bendable member 240 in FIG. 4), and thus may not be seen from the outside. According to an embodiment, at least a part of the flexible display 230 may be, in a slide-out state, disposed to be seen from the outside while being supported by the bendable member (e.g., the bendable member 240 in FIG. 4) at least partially configuring the same plane as the first housing 210.

According to various embodiments, the electronic device 101 may include the first housing 210 including a first lateral member 211, and the second housing 220 including a second lateral member 221. According to an embodiment, the first lateral member 211 may include a first lateral surface 2111 having a first length in a first direction (e.g., y-axis direction), a second lateral surface 2112 extending with a second length shorter than the first length in a direction (e.g., x-axis direction) substantially perpendicular to the first lateral surface 2111, and a third lateral surface 2113 having the first length and extending from the second lateral surface 2112 to be substantially parallel to the first lateral surface 2111. According to an embodiment, the first lateral member 211 may be at least partially made of a conductive material (e.g., metal). In an embodiment, the first lateral member 211 may be made of a combination of a conductive material and a non-conductive material (e.g., polymer). According to an embodiment, the first housing 210 may include a first support member 212 extending from at least a part of the first lateral member 211 to at least a part of the first space 2101. According to an embodiment, the first support member 212 may be integrated with the first lateral member 211. In an embodiment, the first support member 212 may be configured separately from the first lateral member 211 or may be structurally coupled to the first lateral member 211.

According to various embodiments, the second lateral member 221 may include a fourth lateral surface 2211 at least partially corresponding to the first lateral surface 2111 and having a third length, a fifth lateral surface 2212 extending from the fourth lateral surface 2211 in a direction substantially parallel to the second lateral surface 2112 and having a fourth length shorter than the third length, and a sixth lateral surface 2213 having the third length and extending from the fifth lateral surface 2212 to correspond to the third lateral surface 2113. According to an embodiment, the second lateral member 221 may be at least partially made of a conductive material (e.g., metal). In an embodiment, the second lateral member 221 may be made of a combination of a conductive material and a non-conductive material (e.g., polymer). According to an embodiment, at least a part of the second lateral member 221 may include a second support member 222 extending up to at least a part of the second space 2201 of the second housing 220. According to an embodiment, the second support member 222 may be integrated with the second lateral member 221. In an embodiment, the second support member 222 may be configured separately from the second lateral member 221 or may be structurally coupled to the second lateral member 221.

According to various embodiments, the first lateral surface 2111 and the fourth lateral surface 2211 may be coupled to be slidable with respect to each other. According to an embodiment, the third lateral surface 2113 and the sixth lateral surface 2213 may be coupled to be slidable with respect to each other. According to an embodiment, in a slide-in state, the first lateral surface 2111 may overlap with the fourth lateral surface 2211 and may be thus not be substantially seen from the outside. According to an embodiment, in a slide-in state, the third lateral surface 2113 may overlap with the sixth lateral surface 2213 and may be thus not be substantially seen from the outside. In an embodiment, at least a part of the first lateral surface 2111 and the third lateral surface 2113 may be, in a slide-in state, arranged to be at least partially visible from the outside. According to an embodiment, the first support member 212 may, in a slide-in state, overlap with the second support member 222 and thus may not be substantially seen from the outside. In an embodiment, a part of the first support member 212 may, in a slide-in state, overlap with the second support member 222 and thus may not be seen from the outside, and a remaining part of the first support member 212 may be visible from the outside.

According to various embodiments, the electronic device 101 may include a first rear cover 213 disposed at a rear surface thereof and coupled to the first housing 210. According to an embodiment, the first rear cover 213 may be disposed through at least a part of the first support member 212. In an embodiment, the first rear cover 213 may be integrated with the first lateral member 211. According to an embodiment, the first rear cover 213 may be made of, for example, polymer, coated or colored glass, ceramic, metal (e.g., aluminum, stainless steel (STS), or magnesium), or a combination of two or more of these materials. In an embodiment, the first rear cover 213 may extend up to at least a part of the first lateral member 211. In an embodiment, at least a part of the first support member 212 may be replaced with the first rear cover 213.

According to various embodiments, the electronic device 101 may include a second rear cover 223 disposed at a rear surface thereof and coupled to the second housing 220. According to an embodiment, the second rear cover 223 may be disposed through at least a part of the second support member 222. In an embodiment, the second rear cover 223 may be integrated with the second lateral member 221. According to an embodiment, the second rear cover 223 may be made of, for example, polymer, coated or colored glass, ceramic, metal (e.g., aluminum, stainless steel (STS), or magnesium), or a combination of two or more of these materials. In an embodiment, the second rear cover 223 may extend up to at least a part of the second lateral member 221. In an embodiment, at least a part of the second support member 222 may be replaced with the second rear cover 223.

According to various embodiments, the electronic device 101 may include the flexible display 230 disposed to be supported by at least a part of the first housing 210 and the second housing 220. According to an embodiment, the flexible display 230 may include a first part 230a (e.g., a planar part or a display region) always seen from the outside, and a second part 230b (e.g., a flexible part) that extends from the first part 230a and is at least partially accommodated in the second space 2201 of the second housing 220 so that at least a part is not seen from the outside in a slide-in state. According to an embodiment, the first part 230a may be disposed to be supported by the first housing 210, and the second part 230b may be disposed to be at least partially supported by the bendable member (e.g., the bendable member 240 in FIG. 4). According to an embodiment, the second part 230b of the flexible display 230 may be disposed to extend from the first part 230a, configure a plane substantially identical to the first part 230a, and be visible from the outside while being supported by the bendable member (e.g., the bendable member 240 in FIG. 4), in a state where the first housing 210 has been slid out in the first direction (direction ①) According to an embodiment, the second part 230b of the flexible display 230 may be disposed to be accommodated in the second space 2201 of the second housing 220 and not to be seen from the outside in a state where the first housing 210 has been slid in along the second direction (direction ②). Therefore, the electronic device 101 may induce a display area of the flexible display 230 to be changed according to sliding of the first housing 210 from the second housing 220 in a designated direction (e.g., ±y-axis direction).

According to various embodiments, the flexible display 230 may have a length in the first direction (direction ①) (or the second direction (direction ②)), which is changed according to sliding of the first housing 210 moved with respect to the second housing 220. For example, the flexible display 230 may have a first display area (e.g., a region corresponding to the first part 230a) corresponding to a first length L1 in a slide-in state. According to an embodiment, the flexible display 230 may, in a slide-out state, be expanded to have a second display area (e.g., a region including the first part 230a and the second part 230b) which corresponds to a third length L3 greater than the first length L1 and is greater than the first display area according to sliding of the first housing 210 additionally moved by a second length L2 with respect to the second housing 220.

According to various embodiments, the electronic device 101 may include at least one of an input device (e.g., a first microphone 203-1), a sound output device (e.g., a call receiver 206 or a speaker 207), sensor modules 204 and 217, a camera module (e.g., a first camera module 205 or a second camera module 216), a connector port 208, a key input device 219, or an indicator (not illustrated), which are arranged in the first space 2101 of the first housing 210. According to an embodiment, the electronic device 101 may include another input device (e.g., a second microphone 203) disposed in the second housing 220. As another embodiment, the electronic device 101 may be configured to omit at least one of the above elements or additionally include other elements. As another embodiment, at least one of the above elements may be disposed in the second space 2201 of the second housing 220.

According to various embodiments, the input device may include the first microphone 203-1 and the second microphone 203. In an embodiment, the input device (e.g., the first microphone 203-1 and the second microphone 203) may include multiple microphones arranged to be able to sense the direction of sound. The sound output device may include, for example, the call receiver 206 and the speaker 207. According to an embodiment, the speaker 207 may meet the outside through at least one speaker hole disposed on the first housing 210 at a position (e.g., the second lateral surface 2112) always exposed to the outside regardless of a slide-in/slide-out state. According to an embodiment, the connector port 208 may meet the outside through a connector port hole disposed on the first housing 210 in a slide-out state. According to an embodiment, the connector port 208 may also meet the outside through an opening disposed on the second housing 220 to correspond to the connector port hole, in a slide-in state. In an embodiment, the call receiver 206 may include a speaker (e.g., a piezo speaker) that is operated without a separate speaker hole.

According to various embodiments, the sensor modules 204 and 217 may generate an electrical signal or a data value corresponding to an internal operation state or an external environment state of the electronic device 101. The sensor modules 204 and 217 may include, for example, a first sensor module 204 (e.g., a proximity sensor or an illuminance sensor) disposed at a front surface of the electronic device 101, and/or a second sensor module 217 (e.g., a heart rate monitoring (HRM) sensor) disposed at a rear surface of the electronic device 101. According to an embodiment, the first sensor module 204 may be disposed under the flexible display 230 at the front surface of the electronic device 101. According to an embodiment, the first sensor module 204 and/or the second sensor module 217 may include at least one of a proximity sensor, an illuminance sensor, a time-of-flight (TOF) sensor, an ultrasonic sensor, a fingerprint recognition sensor, a gesture sensor, a gyro sensor, an atmospheric pressure sensor, a magnetic sensor, an acceleration sensor, a grip sensor, a color sensor, an infrared (IR) sensor, a biometric sensor, a temperature sensor, or a humidity sensor.

According to various embodiments, the camera module may include the first camera module 205 disposed at the front surface of the electronic device 101, and the second camera module 216 disposed at the rear surface of the electronic device 101. According to an embodiment, the electronic device 101 may include a flash (not illustrated) positioned near the second camera module 216. According to an embodiment, the camera modules 205 and 216 may include one or multiple lenses, an image sensor, and/or an image signal processor. According to an embodiment, the first camera module 205 may be disposed under the flexible display 230, and may be configured to capture an image of a subject through a part of an activation region (e.g., a display region) of the flexible display 230. For example, the second camera module 216 or the flash (not illustrated) may be disposed on a rear surface of the first housing 210.

According to various embodiments, the first camera module 205 among the camera modules and some sensor modules among the sensor modules 204 and 217 may be arranged to detect an external environment through the flexible display 230. For example, the first camera module 205 and some sensor modules (e.g., first sensor module 204) may be arranged to come into contact with an external environment through a perforated opening or a transmission region disposed on the flexible display 230 in the first space 2101 of the first housing 210. According to an embodiment, a region facing the first camera module 205 of the flexible display 230 is a part of a display region displaying contents, and may be configured as a transmission region having a designated transmissivity. According to an embodiment, the transmission region may be configured to have a transmissivity within a range of about 5% to 20%. Such a transmission region may include a region overlapping with a valid region (e.g., an angle-of-view region) of the first camera module 205, which is a passage for light that generates an image by meeting on an image sensor. For example, the transmission region of the flexible display 230 may include a region having a pixel arrangement density and/or a wire density lower than the surrounding region. For example, the transmission region may be replaced with the above opening. For example, some camera modules (e.g., first camera module 205) may include an under display camera (UDC). In an embodiment, some sensor devices (e.g., first sensor module 204) may be disposed to perform a function thereof without being visually exposed through the flexible display 230 in an inner space of the electronic device 101.

According to various embodiments, the electronic device 101 may include at least one antenna electrically connected to a wireless communication circuit (e.g., the wireless communication module 192 in FIG. 1) disposed on the second housing 220. According to an embodiment, the electronic device 101 may include a bezel antenna A disposed through the conductive second lateral member 221 of the second housing 220. For example, the bezel antenna A may include a conductive part 227 disposed in at least a part of the fifth lateral surface 2212 and the sixth lateral surface 2213 of the second lateral member 221, and electrically divided through at least one dividing part 2271 and 2272 made of a non-conductive material (e.g., polymer). According to an embodiment, the wireless communication circuit (e.g., the wireless communication module 192 in FIG. 1) may be configured to transmit or receive a wireless signal through the conductive part 227 in at least one designated frequency band (e.g., about 800 megahertz (MHz)-6000 MHz) (e.g., legacy band). According to an embodiment, the electronic device 101 may include a lateral cover 2212a disposed on the fifth lateral surface 2212 so as to cover at least a part of the at least one dividing part 2271. In an embodiment, the bezel antenna A may be disposed on at least one lateral surface among the second lateral surface 2112, the fourth lateral surface 2211, the fifth lateral surface 2212, and the sixth lateral surface 2213. In an embodiment, the electronic device 101 may further include at least one antenna module (e.g., a 5G antenna module or an antenna structure) disposed in an inner space (e.g., the first space 2101 or the second space 2201) to transmit or receive a wireless signal through another wireless communication circuit (e.g., the wireless communication module 192 in FIG. 1) in frequency band within a range of about 3 gigahertz (GHz)-100 GHz.

According to various embodiments, a sliding-in/sliding-out operation of the electronic device 101 may be automatically performed. For example, the sliding-in/sliding-out operation of the electronic device 101 may be performed through a gearing operation between a drive motor (e.g., the drive motor 260 in FIG. 4) including a pinion gear (e.g., a pinion gear 261 in FIG. 4) disposed in the first space 2101 of the first housing 210, and a rack gear (e.g., a rack gear 2251 in FIG. 4) disposed in the second space 2201 of the second housing 220 and gear-coupled to the pinion gear 261. For example, in a case where a triggering operation for changing from a slide-in state to a slide-out state or changing from a slide-out state to a slide-in state is detected, a processor (e.g., the processor 120 in FIG. 1) of the electronic device 101 may operate a drive module (e.g., the drive motor 260 in FIG. 4) disposed in the electronic device 101. According to an embodiment, the triggering operation may include at least one of selection (e.g., a touch) of an object displayed on the flexible display 230, manipulation of a physical button (e.g., a key button) included in the electronic device 101, execution of a function or an application program related to triggering, a voice input, or reception of a wireless signal related to triggering.

The electronic device 101 according to various embodiments of the disclosure may provide an extended sliding stroke by having a design structure (e.g., a structure in which the drive motor 260 is disposed at a lower end of the first housing 210 in a slide-in state) in which the drive module (e.g., the drive motor 260 in FIG. 4) is disposed at an end part (e.g., the lower end of the first housing 210 in a slide-in state) in a sliding-in direction (direction ②) in the first space 2101 of the first housing 210, and the pinion gear (e.g., the pinion gear 261 in FIG. 4) of the drive module (e.g., the drive motor 260) is moved while following the rack gear (e.g., the rack gear 2251 in FIG. 4) correspondingly disposed in the second space 2201 of the second housing 220. In addition, the electronic device 101 may include electronic components (e.g., a substrate or a battery) arranged in the first space 2101 of the first housing 210 together with the drive module (e.g., the drive motor 260), so as to provide a structure for efficient electrical connection with the drive module (e.g., the drive motor 260). In addition, in a slide-out state, the electronic device may include a support structure disposed in the second space 2201 of the second housing 220 to support at least a part of the flexible display 230, so as to assist in improving operational reliability of the electronic device 101.

Figure 4:
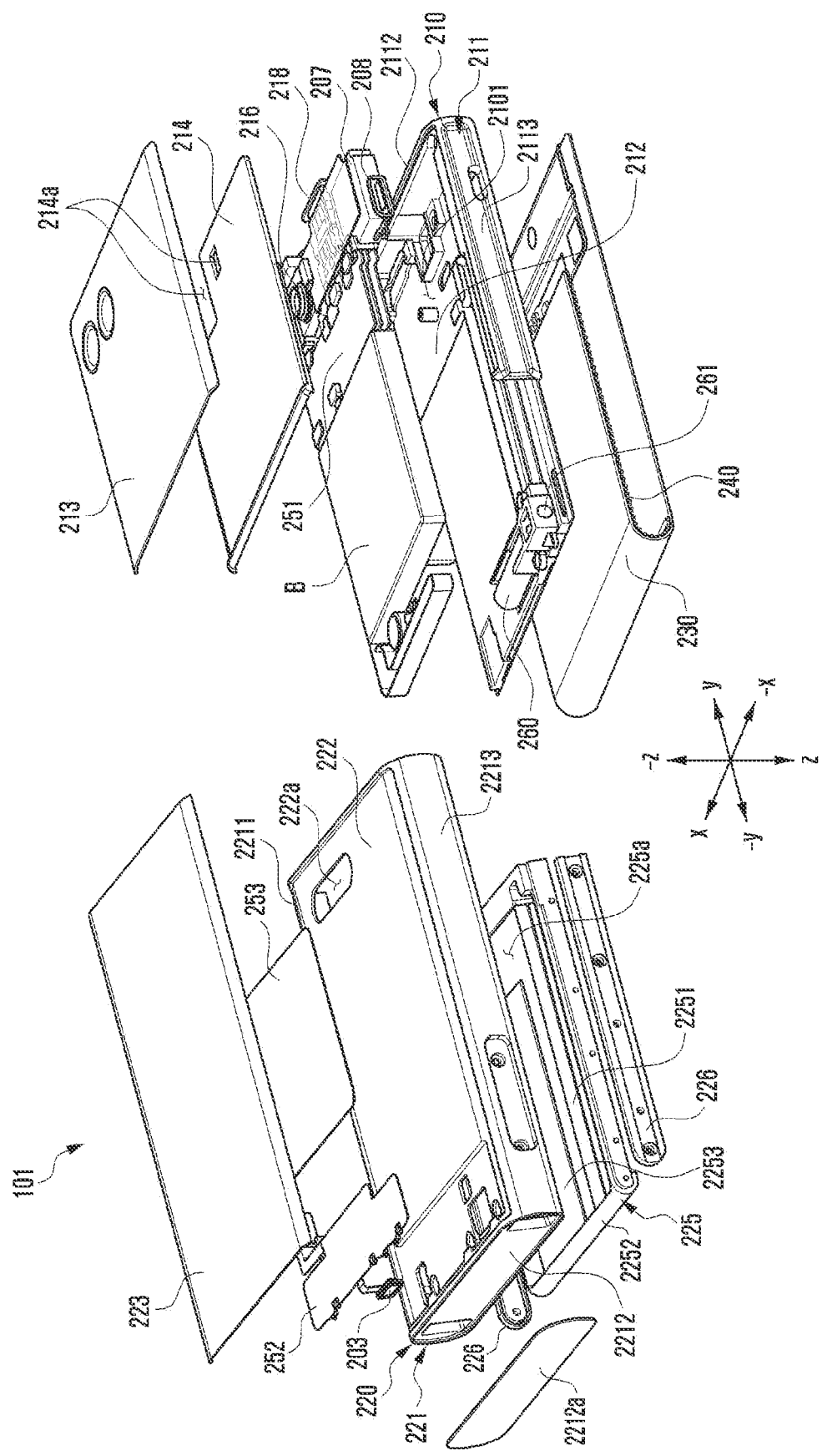
FIG. 4 is an exploded perspective view of an electronic device according to an embodiment of the disclosure.

FIG. 4 is an exploded perspective view of an electronic device according to an embodiment of the disclosure. Hereinafter, in describing the electronic device 101 in FIG. 4, the same signs are assigned to elements substantially identical to those of the electronic device 101 in FIGS. 2A, 2B, 3A, and 3B, and a detailed description thereof may be omitted.

Referring to FIG. 4, the electronic device 101 may include the first housing 210 including the first space 2101, the second housing 220 slidably coupled to the first housing 210 and including a second space (e.g., the second space 2201 in FIG. 3A), the bendable member 240 at least partially rotatably disposed in the second space 2201, the flexible display 230 disposed to be supported by the first housing 210 and at least a part of the bendable member 240, and the drive module that performs driving in a direction (e.g., −y-axis direction) in which the first housing 210 is to be slid into the second housing 220 and/or a direction (e.g., y-axis direction) in which the first housing 210 is to be slide out of the second housing 220. According to an embodiment, the drive module may include the drive motor 260 disposed in the first space 2101 and including the pinion gear 261, and the rack gear 2251 disposed in the second space 2201 to be gear-coupled to the pinion gear 261. According to an embodiment, the drive module may further include a speed reduction module disposed to be coupled to the drive motor 260 to reduce a rotation speed and increase a drive force. According to an embodiment, the drive motor 260 may be disposed in the first space 2101 of the first housing 210, to be supported through at least a part of the first support member 212. According to an embodiment, the drive motor 260 may be fixed to, in the first space 2101, an end part (e.g., edge) of the first support member 212 in a sliding-in direction (e.g., −y-axis direction).

According to various embodiments, the electronic device 101 may include multiple electronic components arranged in the first space 2101. According to an embodiment, the multiple electronic components may include a first substrate 251 (e.g., main substrate), and the camera module (e.g., second camera module 216), a socket module 218 (e.g., SIM tray), the speaker 207, the connector port 208, and a battery B which are arranged around the first substrate 251. According to an embodiment, the multiple electronic components may be arranged around the first substrate 251 together with the drive motor 260 in the first space 2101 of the first housing 210, so as to be efficiently electrically connected.

According to various embodiments, the electronic device 101 may include a rear bracket 214 disposed between the first support member 212 of the first housing 210 and the first rear cover 213 to cover at least a part of the multiple electronic components. According to an embodiment, the rear bracket 214 may be structurally coupled to at least a part of the first support member 212. In an embodiment, the rear bracket 214 may be omitted. According to an embodiment, the rear bracket 214 may be disposed to cover the multiple electronic components and support the first rear cover 213. According to an embodiment, the rear bracket 214 may include a notch region or opening 214a (e.g., a through hole) disposed in a region corresponding to the second camera module 216 and/or a sensor module (e.g., the second sensor module 217 in FIG. 3B). According to an embodiment, the second camera module 216 and/or the second sensor module 217 may be disposed to detect an external environment through the notch region or opening 214a. According to an embodiment, a region of the first rear cover 213, corresponding to at least the second camera module 216 and/or the second sensor module 217 may be processed to be transparent. In an embodiment, the second camera module 216 and/or the second sensor module 217 may also be configured to operate only in a slide-out state of the electronic device 101.

According to various embodiments, the electronic device 101 may include a plate-type support bracket 225 (e.g., a display support bar (DSB)) disposed in the second space 2201 of the second housing 220 and slidably coupled to at least a part of the first support member 212. According to an embodiment, the support bracket 225 may include an opening 225a having a designated size. According to an embodiment, the support bracket 225 may include a support part 2252 disposed at one end thereof and having a curved outer surface to support a rear surface of the bendable member 240 that is bent during a sliding operation. According to an embodiment, the support bracket 225 may include a support plate 2253 extending from at least a part of the support part 2252 to at least a part of the opening 225a so as to support the rear surface of the bendable member 240 in a slide-out state. According to an embodiment, the support bracket 225 may include the rack gear 2251 crossing over the opening 225a and fixed to have a length in a direction parallel to a sliding direction. In an embodiment, the rack gear 2251 may be integrated with the support bracket 225. According to an embodiment, the electronic device 101 may include a pair of guide rails 226 arranged on both lateral surfaces of the support bracket 225 to guide both ends of the bendable member 240 in a sliding direction.

According to various embodiments, the second housing 220 may include an opening 222a (e.g., a through hole) disposed on the second support member 222 in a region corresponding to the second camera module 216 and/or the second sensor module 217 disposed in the first housing 210, when the electronic device 101 is in a slide-in state. According to an embodiment, the second camera module 216 and/or the second sensor module 217 may detect an external environment through the opening 222a disposed on the second housing 220, when the electronic device 101 is in a slide-in state. In this case, a region of the second rear cover 223, corresponding to at least the second camera module 216 and/or the second sensor module 217 may be processed to be transparent.

According to various embodiments, the electronic device 101 may include a second substrate 252 and an antenna member 253 disposed in a space between the second support member 222 of the second housing 220 and the second rear cover 223. According to an embodiment, the second substrate 252 and the antenna member 253 may be electrically connected to the first substrate 251 through at least one electrical connection member (e.g., a flexible printed circuit board (FPCB) or a flexible radio frequency (RF) cable (FRC)). In an embodiment, the antenna member 253 may be electrically connected to the second substrate 252, thereby being electrically connected to the first substrate 251 through the second substrate 252.

According to various embodiments, the electronic device 101 may include the flexible display 230 having a length (or display area) changeable in a direction (e.g., x-axis direction or −x-axis direction) different from a first direction (e.g., y-axis direction) or a second direction (e.g., −y-axis direction). According to an embodiment, the length (or display area) of the flexible display 230 may be changed in a third direction (e.g., x-axis direction) or a fourth direction (e.g., −x-axis direction) according to sliding of a housing relative to another housing among multiple housings.

Figure 5:
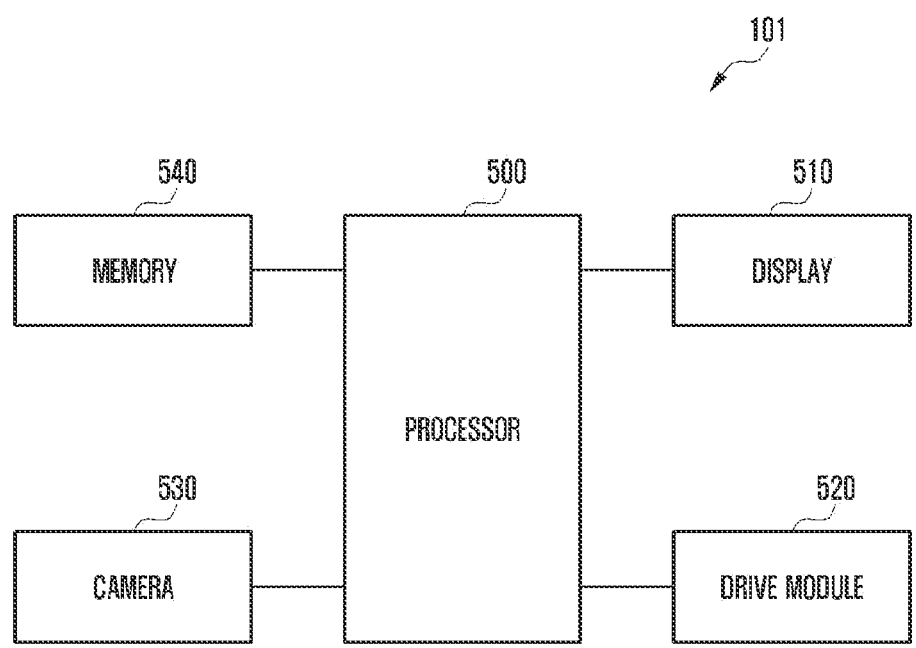
FIG. 5 is a block diagram of an electronic device including a flexible display according to an embodiment of the disclosure.

FIG. 5 is a block diagram of an electronic device including a flexible display according to an embodiment of the disclosure.

According to various embodiments, referring to FIG. 5, the electronic device 101 may include a processor (including processing circuitry) 500, a display 510, a drive module (or drive device) 520, a camera 530, and/or a memory 540. According to an embodiment, the processor 500 may be substantially identical to the processor 120 in FIG. 1, or may be included in the processor 120. According to an embodiment, the display 510 may be substantially identical to the display device 160 in FIG. 1, or may be included in the display device 160. According to an embodiment, the camera 530 may be substantially identical to the camera module 180 in FIG. 1, or may be included in the camera module 180. According to an embodiment, the memory 540 may be substantially identical to the memory 130 in FIG. 1, or may be included in the memory 130. According to an embodiment, the processor 500 may be operatively, functionally, and/or electrically connected to the display 510, the drive module 520, and/or the memory 540.

According to various embodiments, the display 510 is a flexible display (e.g., the flexible display 230 in FIGS. 2A, 2B, 3A, 3B, and 4), and a display area thereof may be changed (e.g., enlarged or reduced). For example, the display area may indicate the size of a display region of the display 510, which is exposed to the outside and displays information. According to an embodiment, the display 510 may be disposed to be supported by at least a part of a first housing (e.g., the first housing 210 in FIG. 2A) and a second housing (e.g., the second housing 220 in FIG. 2A) of the electronic device 101. The display 510 may include a first part (e.g., the first part 230a in FIG. 3A) always seen from the outside, and a second part (e.g., the second part 230b in FIG. 3A) that extends from the first part 230a and is at least partially accommodated in the second space 2201 of the second housing 220 so that at least a part is not seen from the outside in a slide-in state. For example, the second part 230b of the display 510 may be disposed to be accommodated in the second space 2201 of the second housing 220 and not to be seen from the outside in a state where the first housing 210 has been slid in the second housing 220 in the second direction (direction ② in FIG. 2B). For example, the display 510 may have a first display area (e.g., a region corresponding to the first part 230a) corresponding to the first length L1 in a state where the first housing 210 has been slid in the second housing 220. For example, the display region of the display 510 may have the size of the first display area in a state where the first housing 210 has been slid in the second housing 220. For example, the second part 230b of the display 510 may be disposed to extend from the first part 230a and be visible from the outside in a state where the first housing 210 has been slid out of the second housing 220 in the first direction (direction ① in FIG. 3B). For example, the display 510 may have a second display area (e.g., a region including the first part 230a and the second part 230b) corresponding to the third length L3 in a state where the first housing 210 has been slid out of the second housing 220. For example, the display region of the display 510 may have the size of the second display area in a state where the first housing 210 has been slid out of the second housing 220. For example, the third length may include a length greater than the first length. For example, the second display area may include an area greater than the first display area.

According to an embodiment, the display 510 may display information processed in the electronic device 101. For example, the information processed in the electronic device 101 may be displayed through the display region of the display 510 or at least a part of the display region. For example, the information processed in the electronic device 101 may include at least one of an image (e.g., a preview image) obtained via the camera 530 or at least one control object related to the camera 530. For example, the control object related to the camera 530 is an icon corresponding to a command related to driving of the camera 530, and may include at least one of a setting menu related to image acquisition using the camera 530, an image capturing button, or an image identification button. For example, the setting menu related to image acquisition may include a menu related to at least one setting among flash, a timer, an aspect ratio of an image, an image capturing mode, or image effects.

According to various embodiments, the drive module 520 may change a display area of the display 510. For example, changing of the display area may include a state where the size (or length) of the display region of the display 510 is expanded or reduced according to sliding of the first housing 210 from the second housing 220 of the electronic device 101. According to an embodiment, the drive module 520 may control the first housing 210 and/or the second housing 220 so that the first housing 210 is slide into the second housing 220 or the first housing 210 is slide out of the second housing 220. For example, the drive module 520 may include the drive motor 260 shown in FIG. 4.

According to an embodiment, the processor 500 may control the display 510 to display an image obtained via the camera 530. According to an embodiment, the processor 500 may activate the camera 530 when occurrence of an event related to the camera 530 is detected. The processor 500 may control the display 510 to display an image (e.g., a preview image) obtained via the activated camera 530. For example, the event related to the camera 530 may be generated based on at least one of a selection (e.g., a touch) of an object (e.g., an icon) displayed on the display 510 and related to the camera 530, a manipulation of a physical button (e.g., a key button) included in the electronic device 101, an execution of a function or an application program related to the camera 530, a voice input, or reception of a wireless signal related to the camera 530. For example, the size of the image obtained via the camera 530 may be configured based on the size (e.g., a display area) of the display region of the display 510 at a time point of displaying the image. For example, the aspect ratio of the image obtained via the camera 530 may be configured based on a user input or a pre-defined configuration of the camera 530, or may be configured based on the size (e.g., a display area) of the display region of the display 510. For example, the aspect ratio of the image may indicate the ratio between a horizontal length and a vertical length of the image (e.g., a preview image).

According to various embodiments, the processor 500 may control the drive module 520 to change the display area of the display 510. According to an embodiment, in a case where a triggering operation for changing the display area of the display 510 is detected, the processor 500 may operate the drive module 520 to enlarge or reduce the display area of the display 510. For example, in a case where the first housing 210 has been slid in the second housing 220, the drive module 520 may operate such that the first housing 210 is slid out of the second housing 220, based on a control of the processor 500. For example, in a case where the first housing 210 has been slid out of the second housing 220, the drive module 520 may operate such that the first housing 210 is slid into the second housing 220, based on a control of the processor 500. For example, the triggering operation may include at least one of a selection (e.g., a touch) of an object displayed on the display 510, a manipulation of a physical button (e.g., a key button) included in the electronic device 101, an execution of a function or an application program related to triggering, a voice input, or reception of a wireless signal related to triggering.

According to various embodiments, the processor 500 may detect a changed display area of the display 510. According to an embodiment, the processor 500 may detect a changed display area of the display 510, based on a distance by which the first housing 210 has been moved from the second housing 220. For example, the distance by which the first housing 210 has been moved may be obtained (or estimated) based on magnetic data (e.g., magnetic strength and/or the number of detected magnetic bodies) detected via at least one magnetic sensor (e.g., Hall integrated circuit (IC)). For example, the distance by which the first housing 210 has been moved may be obtained (or estimated) based on a driving state (e.g., the rotation count and/or rotation direction of the drive motor 260) of the drive module 520 for moving the first housing 210 (or the second housing 220). For example, the distance by which the first housing 210 has been moved may be obtained (or estimated) based on a capacitance change (e.g., touch information) detected through the second part 230b of the display 510. For example, the changed display area of the display 510 may include a display area of the display 510, detected at a time point of completion of the change of the display area of the display 510. For example, the time point of completion of the change of the display area of the display 510 may include a time point of completion of driving of the drive module 520. For example, the changed display area of the display 510 may be periodically detected based on a designated period while the display area of the display 510 is changed.

According to various embodiments, the processor 500 may control the display 510 to display an image (e.g., a preview image) obtained via the camera 530, based on the changed display area of the display 510. According to an embodiment, the image obtained via the camera 530 may be displayed in a changed display region of the display 510, based on a display scheme corresponding to the changed display area of the display 510. For example, the display scheme may include at least one piece of configuration information among the size of the image, a display position of the image and a control object related to the camera 530, or the position of the image displayed in the display region of the display 510.

According to various embodiments, in a case where the display area of the display 510 has been reduced, the processor 500 may determine whether an image (e.g., a preview image) obtained via the camera 530 is displayable in a reduced display region of the display 510. According to an embodiment, the processor 500 may compare the aspect ratio and size (e.g., display area) of the reduced display region of the display 510 with the aspect ratio and size (e.g., display area) of the image (e.g., a preview image) obtained via the camera 530. The processor 500 may determine whether the entirety of the image is displayable in the reduced display region of the display 510 while the aspect ratio and the size of the image are maintained, based on a result of comparison of the aspect ratios and the sizes.

According to an embodiment, in a case where it is determined that the entirety of an image (e.g., a preview image) obtained via the camera 530 is displayable in the reduced display region of the display 510, the processor 500 may control the display 510 to the image (e.g., a preview image) obtained via the camera 530 in the reduced display region. For example, the image displayed in the reduced display region of the display 510 may be maintained at an aspect ratio and a size before change of the display area of the display 510. According to an embodiment, the processor 500 may control the display 510 to display control objects related to the camera 530 or at least a part of the control objects to overlap with at least a part of an image, based on reduction of the display region of the display 510. For example, the size of the control object related to the camera 530 may be fixed regardless of the size of the display region of the display 510, or may be changed based on the size of the display region of the display 510. For example, the control object related to the camera 530 is an icon corresponding to a command related to driving of the camera 530, and may include at least one of a setting menu related to image acquisition using the camera 530, an image capturing button, or an image identification button. For example, the setting menu related to image acquisition may include a menu related to at least one setting among flash, a timer, an aspect ratio of an image, an image capturing mode, or image effects.

According to an embodiment, in a case where it is determined that the entirety of the image (e.g., a preview image) obtained via the camera 530 is not displayable in a reduced display region of the display 510, the processor 500 may detect a main object in the image (e.g., a preview image) obtained via the camera 530. According to an embodiment, in a case where a main object is detected in the image, the processor 500 may control the display 510 to display, based on the main object of the image, a part of the image in the reduced display region of the display 510. The processor 500 may control the display 510 to display a mini map including the entire image in a part of a display region of the display 510. For example, the mini map may be displayed to overlap with at least a part of an image displayed in the display region of the display 510. For example, the size of the image displayed on the mini map may be reduced at an aspect ratio to be the same as that of an image displayed in the display region of the display 510. For example, the image displayed on the display 510 may be maintained at an aspect ratio and a size before change of the display area of the display 510. For example, the main object is a region of interest (ROI) detected and included in the image, and may be configured based on the priorities of objects detected in the image. For example, the main object may include at least one object having a relatively high priority among the objects detected in the image. For example, the priority of the object may be configured based on the priority of a category including the object. For example, the priority of the category may be configured in the order of a person (e.g., face, baby), a pet, and a thing (e.g., flowers, vehicle, and/or shoes). For example, in a case where an image includes multiple objects included in the same category, a main object may include at least one object selected, among the multiple objects, based on the size of the objects and/or the distance between the electronic device 101 and the objects.

According to an embodiment, in a case where a main object is not detected in an image, the processor 500 may reduce the size of the image (e.g., a preview image) obtained via the camera 530, based on the reduced display area of the display 510. The processor 500 may control the display 510 to display the reduced image in the reduced display region of the display 510. For example, the reduced image may be maintained at an aspect ratio before change of the display area of the display 510. For example, an image having no main object detected therein may include an image related to scenery.

According to various embodiments, in a case where the display area of the display 510 has been reduced, the processor 500 may detect a main object in an image (e.g., a preview image) obtained via the camera 530. According to an embodiment, in a case where a main object is detected in the image, the processor 500 may control the display 510 to display, based on the main object of the image, a part of the image in the reduced display region of the display 510. The processor 500 may control the display 510 to display a mini map including the entire image in a part of a display region of the display 510. For example, the image displayed on the display 510 may be maintained at an aspect ratio and a size before change of the display area of the display 510. For example, while the mini map is maintained at the same aspect ratio as that of the image displayed in the display region of the display 510, the mini map may include the entirety of the image having a reduced size.

According to an embodiment, in a case where a main object is not detected in an image, the processor 500 may reduce the size of the image (e.g., a preview image) obtained via the camera 530, based on the reduced display area of the display 510. The processor 500 may control the display 510 to display the reduced image in the reduced display region of the display 510. For example, the reduced image may be maintained at an aspect ratio before change of the display area of the display 510.

According to various embodiments, in a case where the display area of the display 510 is enlarged, the processor 500 may identify whether control objects related to the camera 530 or at least a part of the control objects has been displayed to overlap with an image (e.g., a preview image) obtained via the camera 530, through the display region of the display 510 before the change (e.g., expansion) of the display area. According to various embodiments, in a case where the control objects or the at least a part of the control objects overlaps with the image, the processor 500 may control the display 510 such that the control objects related to the camera 530 or the at least a part of the control objects does not overlap with the image (e.g., a preview image) obtained via the camera 530, based on the expanded display area of the display 510. For example, the image (e.g., a preview image) obtained via the camera 530 may be displayed in a first region of an expanded display region of the display 510. The control objects related to the camera 530 or the at least a part of the control objects may be displayed in a second region different from the first region in the expanded display region of the display 510. For example, the image displayed on the display 510 may be maintained at an aspect ratio and a size before change of the display area of the display 510. For example, the image displayed on the display 510 may be maintained at an aspect ratio before change of the display area of the display 510, and the size of the image may be enlarged based on the expanded display area of the display 510. For example, the size of the control object related to the camera 530 may be fixed regardless of the size of the display region of the display 510, or may be changed based on the size of the display region of the display 510.

According to an embodiment, in a case where a control object and an image do not overlap with each other, the processor 500 may enlarge the size of the image (e.g., a preview image) obtained via the camera 530, based on the expanded display area of the display 510. The processor 500 may control the display 510 to display the enlarged image in the expanded display region of the display 510. For example, the enlarged image may be maintained at an aspect ratio before change of the display area of the display 510.

According to various embodiments, in a case where the display area of the display 510 has been expanded, the processor 500 may detect a main object in an image (e.g., a preview image) obtained via the camera 530. According to an embodiment, in a case where a main object is detected in the image, the processor 500 may control the display 510 to display, based on the main object of the image, the image obtained via the camera 530 in the expanded display region of the display 510. For example, the processor 500 may control the display 510 to display the main object of the image in a central region of the expanded display region of the display 510. For example, the central region of the expanded display region of the display 510 may include at least a partial region in the middle of the expanded display region of the display 510. For example, the processor 500 may control the display 510 to display the main object of the image in at least a partial region of the expanded display region of the display 510, which corresponds to a position at which the main object has been displayed before expansion of the display area of the display 510. For example, the image displayed on the display 510 may be maintained at an aspect ratio and a size before change of the display area of the display 510. For example, the image displayed on the display 510 may be maintained at an aspect ratio before change of the display area of the display 510, and the size of the image may be enlarged based on the expanded display area of the display 510.

According to an embodiment, in a case where a main object is not detected in an image, the processor 500 may enlarge the size of the image (e.g., a preview image) obtained via the camera 530, based on the expanded display area of the display 510. The processor 500 may control the display 510 to display the enlarged image in the expanded display region of the display 510. For example, the enlarged image may be maintained at an aspect ratio before change of the display area of the display 510.

According to various embodiments, the camera 530 may capture a still image and/or a moving image. According to an embodiment, the camera 530 may include multiple cameras (e.g., the first camera module 205 in FIG. 2A and/or the second camera module 216 in FIG. 2B) included in the electronic device 101.

According to various embodiments, the memory 540 may store various data used by at least one element (e.g., the processor 500, the display 510, the drive module 520, and/or the camera 530) of the electronic device 101. According to an embodiment, the memory 540 may store various instructions executable via the processor 500.

According to various embodiments, an electronic device (e.g., the electronic device 101 in FIG. 1, 2A, 2B, 3A, 3B, 4, or 5) may include a first housing (e.g., the first housing 210 in FIG. 2A, 2B, 3A, 3B, or 4), a second housing (e.g., the second housing 220 in FIG. 2A, 2B, 3A, 3B, or 4) slidably coupled to the first housing, a flexible display (e.g., the display device 160 in FIG. 1, the flexible display 230 in FIGS. 2A, 2B, 3A, 3B, and 4, or the display 510 in FIG. 5) disposed to be supported by the first housing and the second housing and having a display region with a changeable size, and at least one processor (e.g., the processor 120 in FIG. 1 or the processor 500 in FIG. 5) operatively connected to the flexible display, wherein the at least one processor is configured to display an image obtained via the camera in at least a part of the display region of the flexible display, in case that reduction of the display region of the flexible display is detected, compare a size of the reduced display region of the flexible display and a size of the image, and display the image in the reduced display region of the flexible display while maintaining an aspect ratio and the size of the image, based on a result of the comparison, and wherein control objects related to the camera are displayed to overlap with the image displayed in the reduced display region of the flexible display.

According to various embodiments, the at least one processor may be configured to identify whether an entirety of the image is displayable in the reduced display region of the flexible display, based on the result of the comparison, and in case that it is determined that the entirety of the image is displayable in the reduced display region of the flexible display, display the image in the reduced display region of the flexible display while maintaining the aspect ratio and the size of the image.

According to various embodiments, the at least one processor may be configured to, in case that it is determined that a part of the image is displayable in the reduced display region of the flexible display, detect a main object in the image, while maintaining the aspect ratio and the size of the image, display the part of the image in the reduced display region of the flexible display, based on the main object of the image, and display a reduced image corresponding to the image in a part of the reduced display region of the flexible display.

According to various embodiments, the at least one processor may be configured to, in case that the main object is not detected in the image, while maintaining the aspect ratio of the image, reduce the size of the image, based on the size of the reduced display region of the flexible display, and display the image having the reduced size in the reduced display region of the flexible display.

According to various embodiments, the at least one processor may be configured to, in case that expansion of the size of the display region of the flexible display is detected in a state where the image is displayed in the reduced display region of the flexible display, display the image in a third region of the expanded display region of the flexible display, and display at least a part of the control objects related to the camera in a fourth region different from the third region in the display region.

According to various embodiments, the at least one processor is configured to, in case that expansion of the size of the display region of the flexible display is detected in a state where the image is displayed in the reduced display region of the flexible display, detect a main object in the image, and while maintaining the aspect ratio of the image, display the image in the expanded display region of the flexible display, based on the main object of the image.

According to various embodiments, the image displayed in the expanded display region of the flexible display may be expanded based on a size of the expanded display region of the flexible display while the aspect ratio of the image is maintained.

According to various embodiments, the size of the display region of the flexible display may be expanded in case that at least a part of the first housing transitions to a slide-out state from a slide-in state of being accommodated in a space of the second housing, and in case that at least a part of the first housing transitions from the slide-out state to a slide-in state of being accommodated in the space of the second housing, the size of the display region may be reduced.

According to various embodiments, an electronic device (e.g., the electronic device 101 in FIG. 1, 2A, 2B, 3A, 3B, 4, or 5) may include a camera (e.g., the camera module 180 in FIG. 1, first camera module 205 or second camera module 216 of FIG. 2A, 2B, 3A, 3B, 4, or the camera 530 of FIG. 5), a housing including a second housing part (e.g., the second housing 220 in FIG. 2A, 2B, 3A, 3B, or 4) and a first housing part (e.g., the first housing 210 in FIG. 2A, 2B, 3A, 3B, or 4) configured to movably engage with the second housing part between a retracted position and an extended position, a flexible display (e.g., the display device 160 in FIG. 1, the flexible display 230 in FIGS. 2A, 2B, 3A, 3B, and 4, or the display 510 in FIG. 5) coupled to the first housing part such that a size of an area of the flexible display visible from a front side of the housing changes between the retracted position and the extended position of the housing, and at least one processor (e.g., the processor 120 in FIG. 1 or the processor 500 in FIG. 5) operatively connected to the flexible display and the camera, wherein the at least one processor is configured to: display an image obtained via the camera in the display region of the flexible display, in case that reduction of the display region of the flexible display is detected, detect a main object in the image displayed in the display region, and while maintaining an aspect ratio and a size of the image, display a part of the image in the reduced display region of the flexible display, based on the main object of the image.

According to various embodiments, at least a part of control objects related to the camera may be displayed to overlap with the part of the image displayed in the reduced display region of the flexible display.

According to various embodiments, the at least one processor may be configured to display a reduced image corresponding to an entirety of the image obtained via the camera to overlap with the part of the image displayed in the reduced display region of the flexible display.

According to various embodiments, the at least one processor may be configured to, in case that the main object is not detected in the image, while maintaining the aspect ratio of the image, reduce the size of the image, based on the size of the reduced display region of the flexible display, and display the image having the reduced size in the reduced display region of the flexible display.

According to various embodiments, the size of the display region of the flexible display may be expanded in case that at least a part of the first housing transitions to a slide-out state from a slide-in state of being accommodated in a space of the second housing, and in case that at least a part of the first housing transitions from the slide-out state to a slide-in state of being accommodated in the space of the second housing, the size of the display region may be reduced.

Figure 6A:
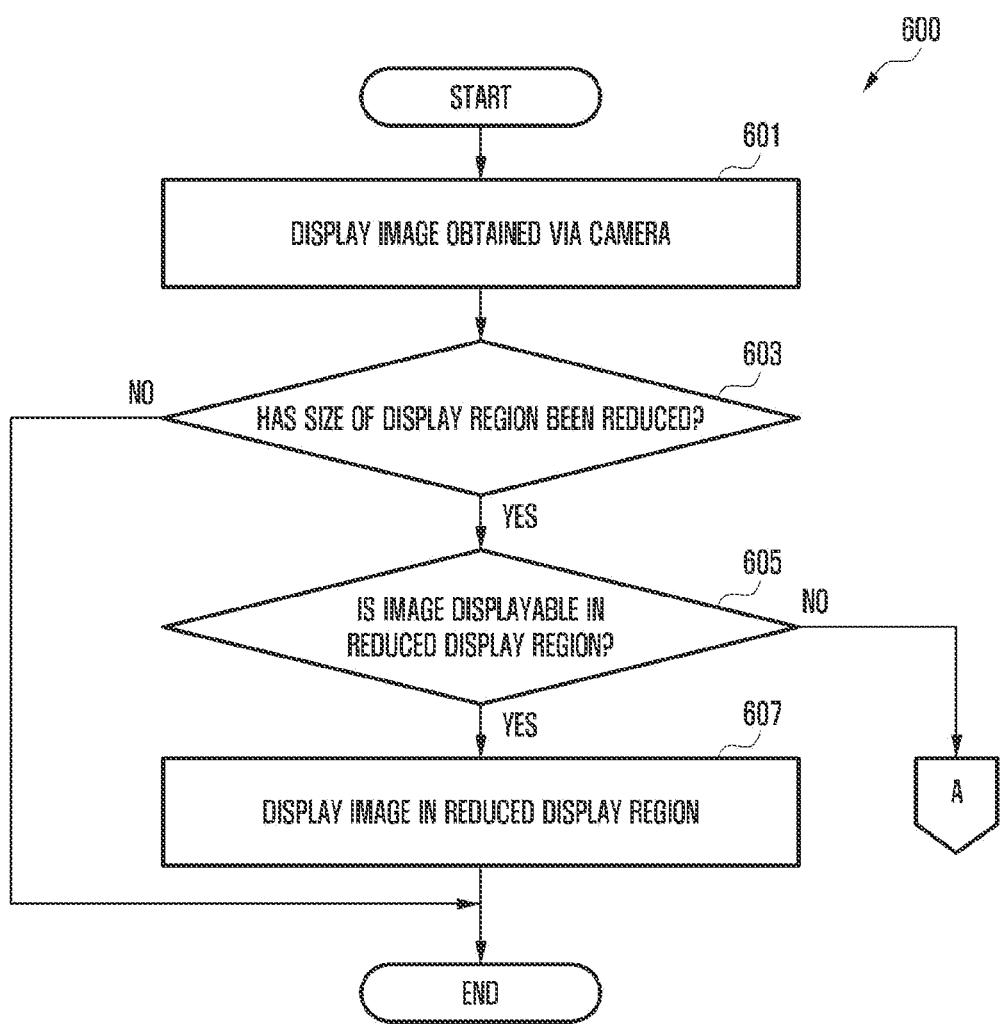
FIG. 6A is a flowchart for displaying an image, based on a change of a display area of a flexible display in an electronic device according to an embodiment of the disclosure.
Figure 6B:
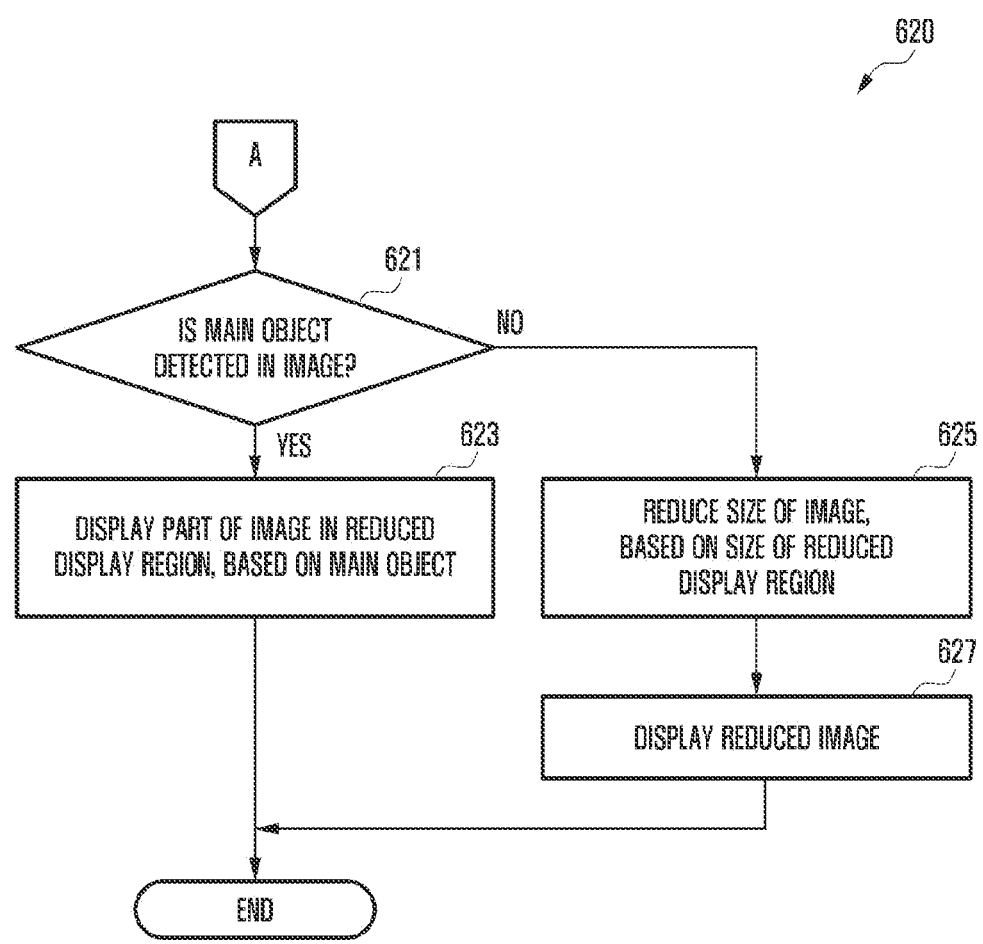
FIG. 6B is a flowchart for controlling an image displaying scheme, based on a change of a display area of a flexible display in an electronic device according to an embodiment of the disclosure.

FIG. 6A is a flowchart for displaying an image, based on a change of a display area of a flexible display in an electronic device according to an embodiment of the disclosure. FIG. 6B is a flowchart for controlling an image displaying scheme, based on a change of a display area of a flexible display in an electronic device according to an embodiment of the disclosure. In an embodiment below, operations may be sequentially performed, but the operations are not required to be necessarily sequentially performed. For example, the order of operations may be changed, and at least two operations may be performed in parallel. For example, an electronic device in FIGS. 6A and 6B may be the electronic device 101 in FIG. 1, 2A, 2B, 3A, 3B, 4, or 5. For example, FIGS. 6A and 6B may be described with reference to FIGS. 7, 8, 9, and 10.

Figure 7:
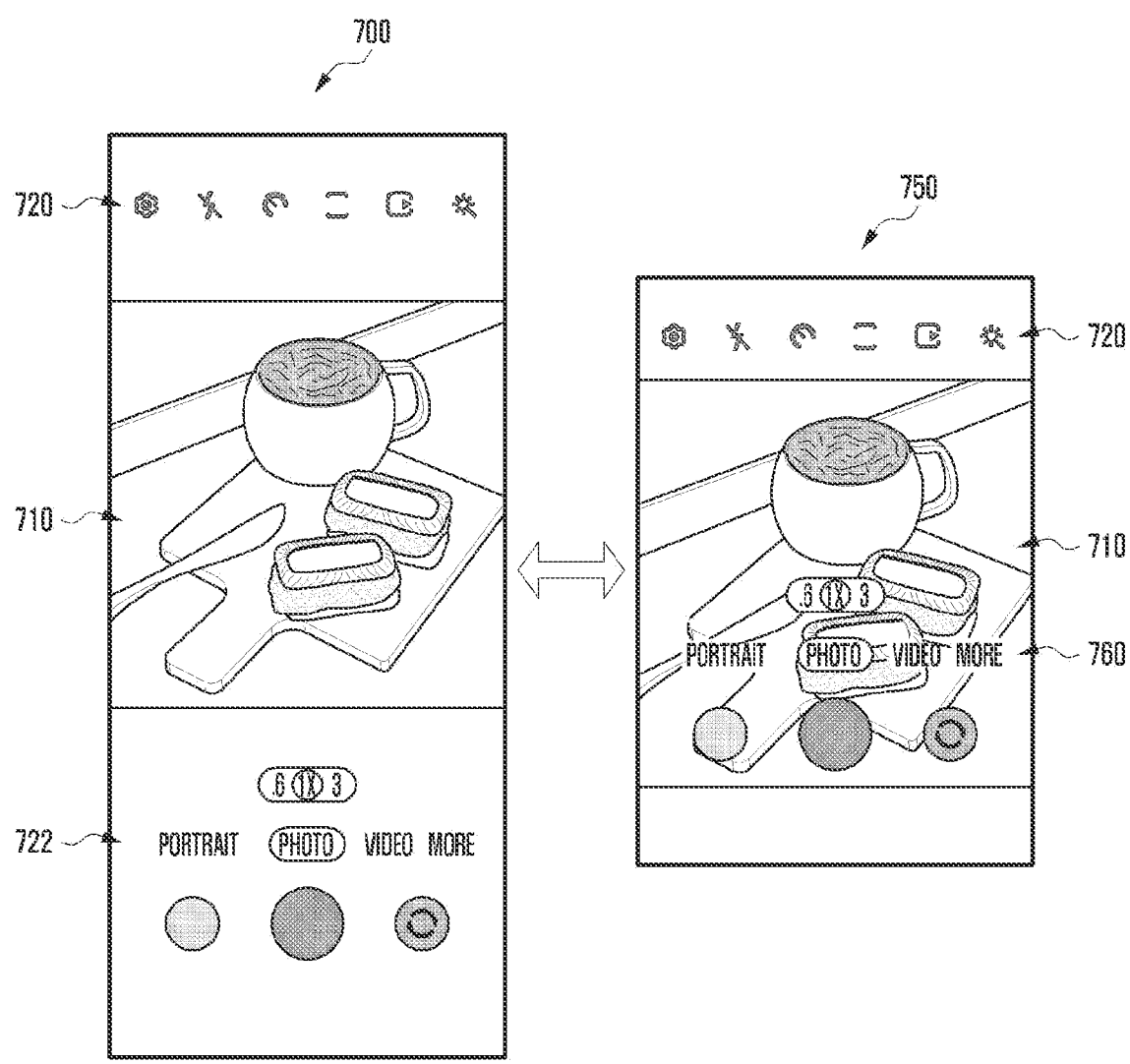
FIG. 7 is an example for displaying control objects, based on reduction of a display area of a flexible display in an electronic device according to an embodiment of the disclosure.

FIG. 7 is an example for displaying control objects, based on reduction of a display area of a flexible display in an electronic device according to an embodiment of the disclosure.

Figure 8:
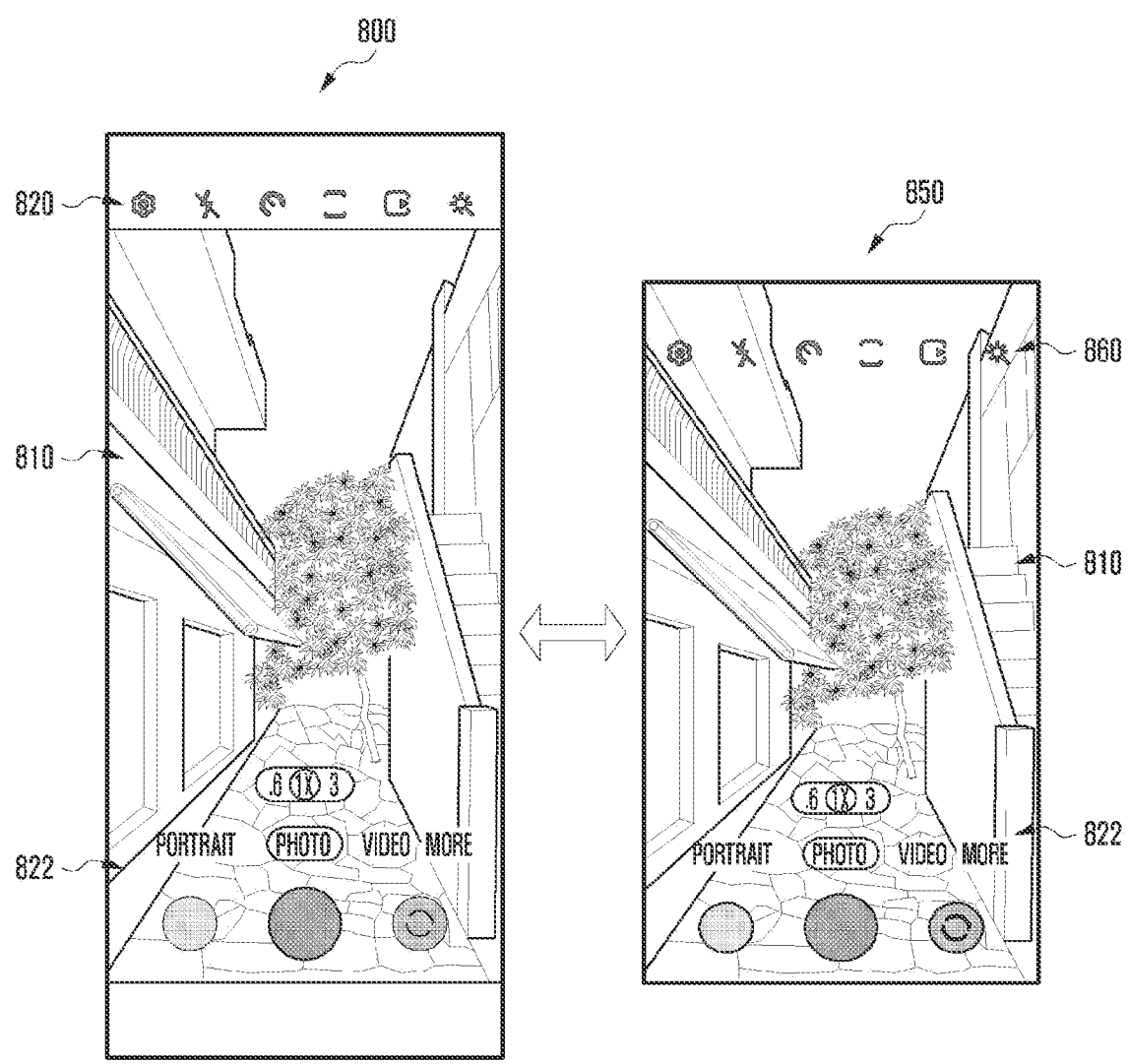
FIG. 8 is another example for displaying control objects, based on reduction of a display area of a flexible display in an electronic device according to an embodiment of the disclosure.

FIG. 8 is another example for displaying control objects, based on reduction of a display area of a flexible display in an electronic device according to an embodiment of the disclosure.

Figure 9:
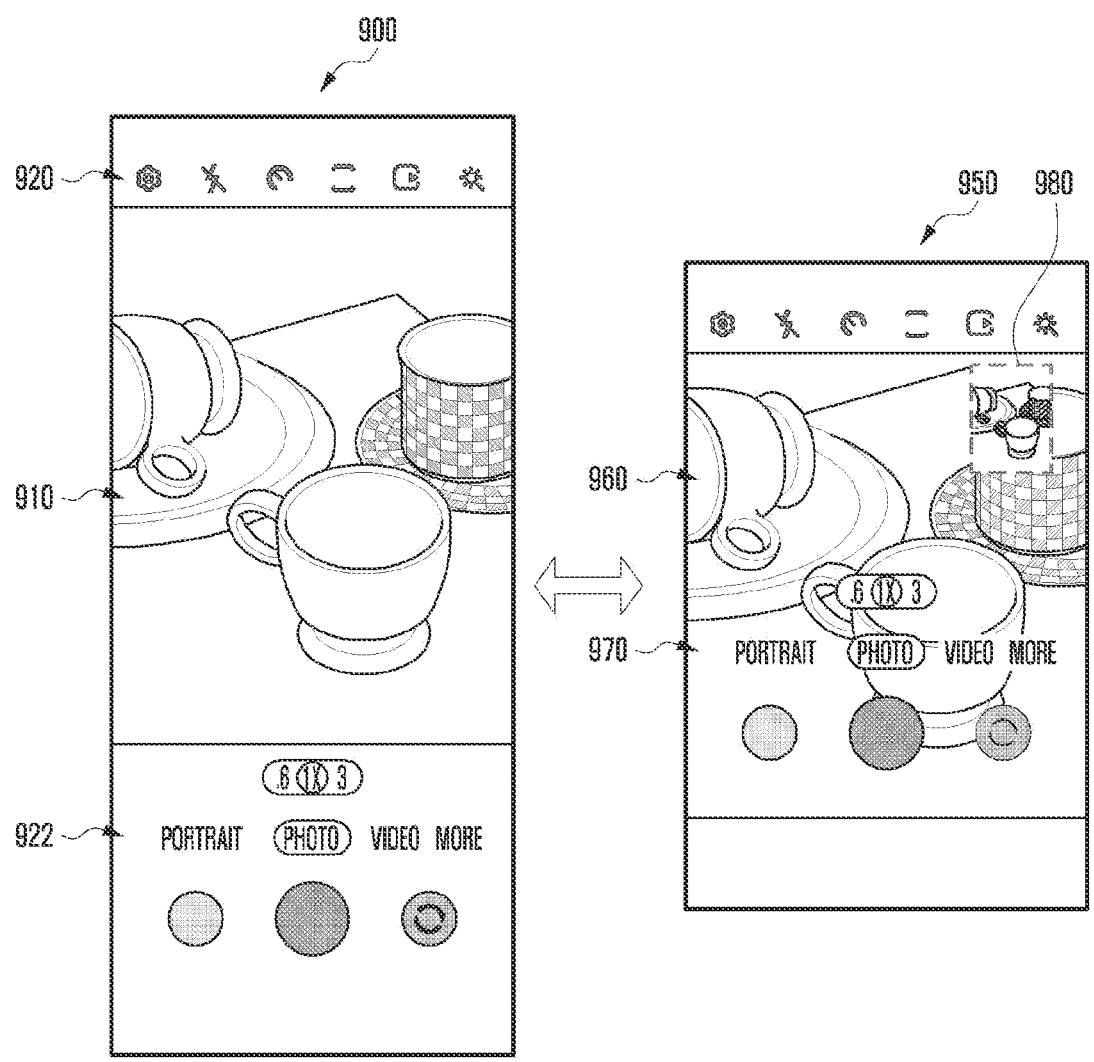
FIG. 9 is an example for displaying a part of an image, based on reduction of a display area of a flexible display in an electronic device according to an embodiment of the disclosure.

FIG. 9 is an example for displaying a part of an image, based on reduction of a display area of a flexible display in an electronic device according to an embodiment of the disclosure.

Figure 10:
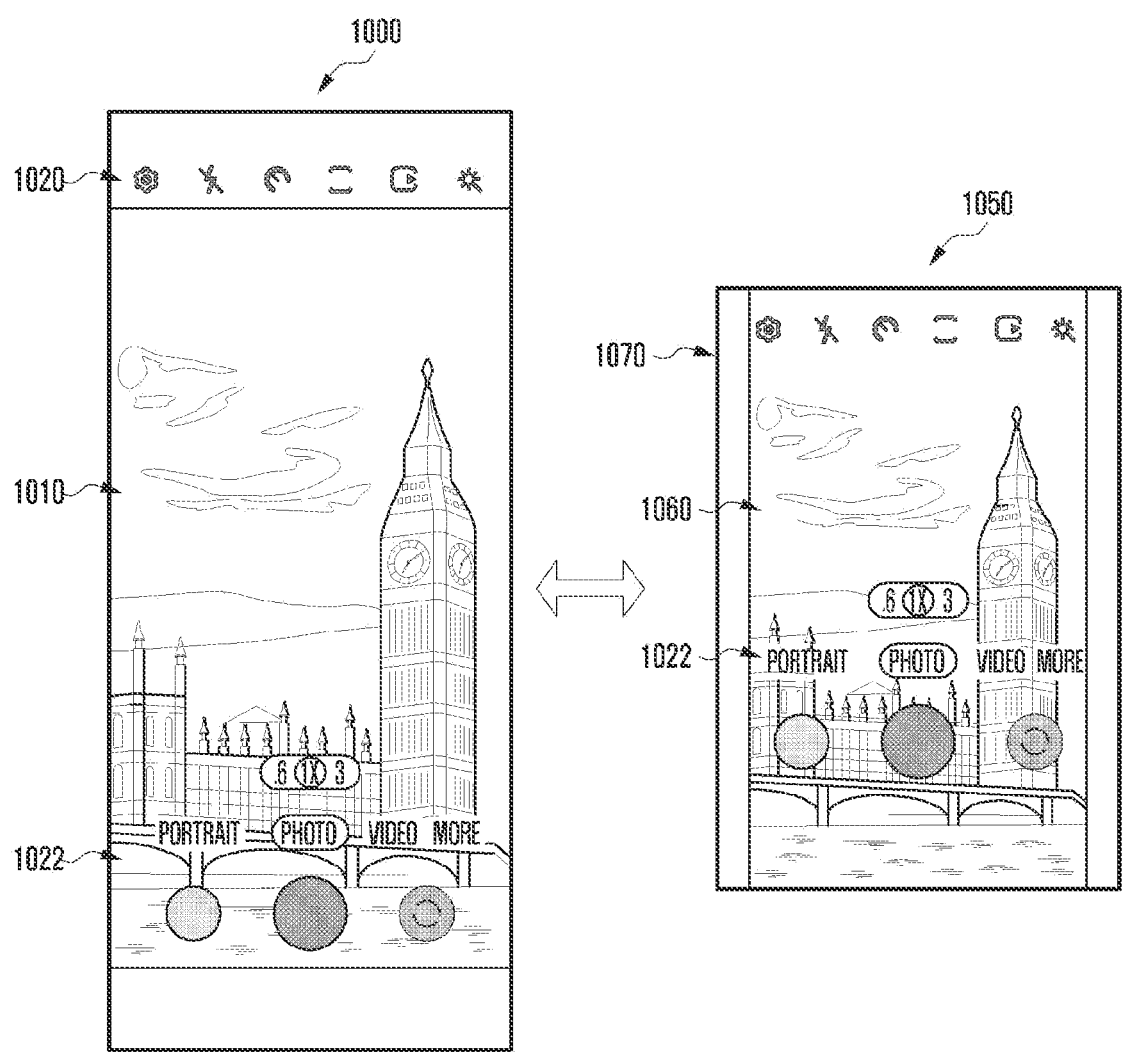
FIG. 10 is an example for reducing the size of an image, based on reduction of a display area of a flexible display in an electronic device according to an embodiment of the disclosure.

FIG. 10 is an example for reducing the size of an image, based on reduction of a display area of a flexible display in an electronic device according to an embodiment of the disclosure.

According to various embodiments referring to FIGS. 6A and 6B (depicting flowcharts 600 and 620, respectively), the electronic device 101 or a processor (e.g., the processor 120 in FIG. 1 or the processor 500 in FIG. 5) may, in operation 601, display an image (e.g., a preview image) obtained via a camera (e.g., the camera module 180 in FIG. 1 or the camera 530 in FIG. 5). According to an embodiment, in a case where the camera 530 operatively connected to the electronic device 101 is activated, the processor 500 may control the display 510 to display an image (e.g., a preview image) obtained via the camera 530. For example, an image 710 (e.g., a preview image) obtained via the camera 530 may be displayed in a first region of a display region 700 of the display 510, as illustrated in FIG. 7. Control objects 720 and 722 related to the camera 530 may be displayed in a second region different from the first region in the display region 700 of the display 510. For example, an image 810 (e.g., a preview image) obtained via the camera 530 may be displayed in a first region of a display region 800 of the display 510, as illustrated in FIG. 8. A part of control objects 820 related to the camera 530 may be displayed in a second region different from the first region in the display region 800 of the display 510. The other part of the control objects 822 related to the camera 530 may be displayed to overlap with at least a part of the image 810 in the first region of the display region 800 of the display 510. For example, the size of the image obtained via the camera 530 may be configured based on the size (e.g., a display area) of the display region 700 or 800 of the display 510 at a time point of displaying the image. For example, the aspect ratio of the image obtained via the camera 530 may be configured based on a user input or a pre-defined configuration of the camera 530, or may be configured based on the size (e.g., a display area) of the display region 700 or 800 of the display 510.

According to various embodiments, the electronic device 101 or a processor (e.g., the processor 120 or 500) may, in operation 603, identify whether the size (e.g., a display area) of a display region of the display 510 is reduced. According to an embodiment, in a case where a triggering operation for changing the display area of the display 510 is detected, the processor 500 may operate the drive module 520 to change (e.g., enlarge or reduce) the display area of the display 510. The change of the display area of the display 510 may be generated by a movement of, by the drive module 520, at least one housing (e.g., the first housing 210) among the first housing 210 and the second housing 220 supporting the display 510. For example, the triggering operation may include at least one of selection (e.g., a touch) of an object displayed on the display 510, manipulation of a physical button (e.g., a key button) included in the electronic device 101, execution of a function or an application program related to triggering, a voice input, or reception of a wireless signal related to triggering.

According to an embodiment, the processor 500 may detect a changed display area of the display 510, based on a distance by which the first housing 210 has been moved from the second housing 220. The processor 500 may determine whether the display area of the display 510 has been reduced, based on the changed display area of the display 510. For example, the distance by which the first housing 210 has been moved may be estimated based on magnetic data (e.g., magnetic strength and/or the number of detected magnetic bodies) detected via at least one magnetic sensor (e.g., Hall IC). For example, the distance by which the first housing 210 has been moved may be estimated based on a driving state (e.g., the rotation count and/or rotation direction of the drive motor 260) of the drive module 520 for moving the first housing 210 (or the second housing 220). For example, the distance by which the first housing 210 has been moved may be estimated based on a capacitance change (e.g., touch information) detected through the second part 230b of the display 510. For example, the changed display area of the display 510 may include a display area of the display 510, detected at a time point (e.g., a time point of completion of driving of the drive module 520) of completion of the change of the display area of the display 510. For example, the changed display area of the display 510 may be periodically detected based on a designated period while the display area of the display 510 is changed (e.g., the drive module 520 is driven).

Figure 12:
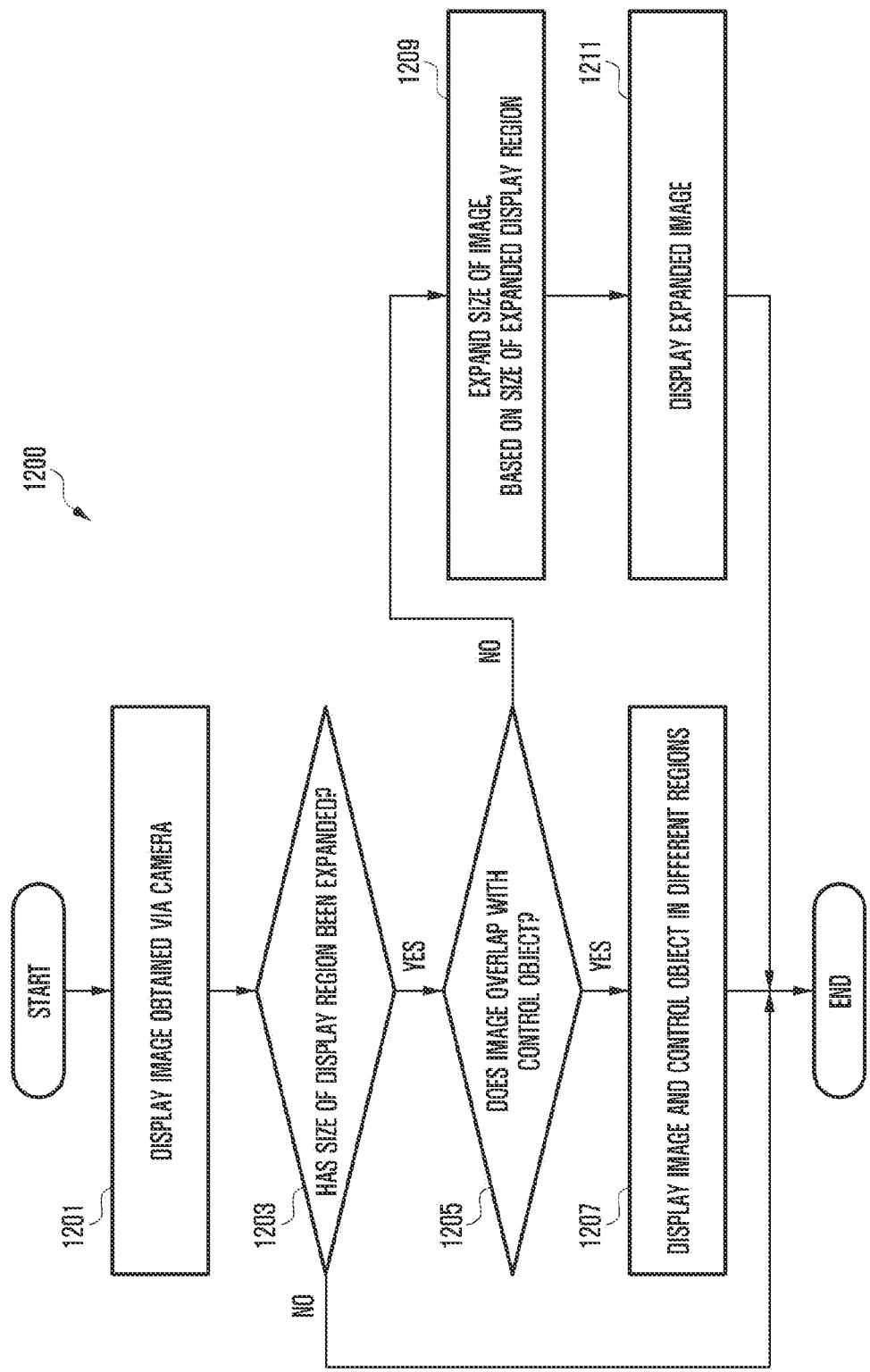
FIG. 12 is a flowchart for displaying an image, based on expansion of a display area of a flexible display in an electronic device according to an embodiment of the disclosure.
Figure 13:
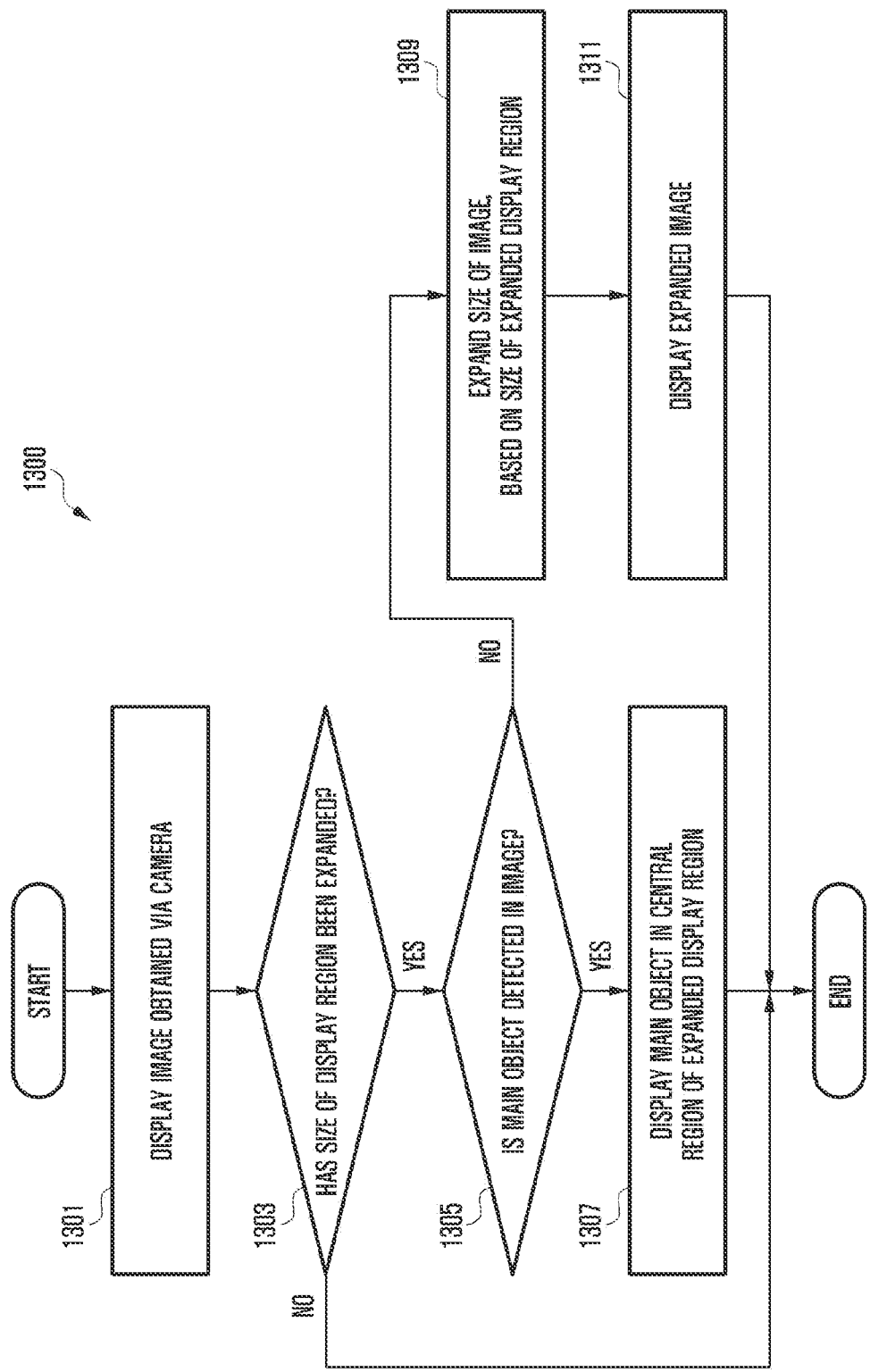
FIG. 13 is a flowchart for displaying a main object of an image, based on expansion of a display area of a flexible display in an electronic device according to an embodiment of the disclosure.

According to various embodiments, in a case where the size (e.g., a display area) of a display region of the display 510 has not been reduced (e.g., "NO" in operation 603), the electronic device 101 or a processor (e.g., the processor 120 or 500) may terminate an embodiment for displaying an image, based on change of the display area of the display 510. According to an embodiment, in a case where the size (e.g., a display area) of a display region of the display 510 is maintained, the processor 500 may terminate an embodiment for displaying an image, based on change of the display area of the display 510. According to an embodiment, in a case where the size (e.g., a display area) of a display region of the display 510 is expanded, the processor 500 may control the display 510 to display an image, based on the expanded display area of the display 510, as illustrated in FIG. 12 or 13.

According to various embodiments, in a case where the size (e.g., a display area) of a display region of the display 510 has been reduced (e.g., "YES" in operation 603), the electronic device 101 or a processor (e.g., the processor 120 or 500) may, in operation 605, determine whether an image (e.g., a preview image) obtained via the camera 530 is displayable in the reduced display region of the display 510. According to an embodiment, the processor 500 may compare the aspect ratio and size (e.g., the display area of the display 510) of the reduced display region of the display 510 with the aspect ratio and size (e.g., display area) of an image (e.g., a preview image) obtained via the camera 530. The processor 500 may determine whether the entirety of the image obtained via the camera 530 is displayable in the reduced display region of the display 510 while the aspect ratio and the size of the image are maintained, based on a result of comparison of the aspect ratios and the sizes.

According to various embodiments, in a case where it is determined that an image (e.g., a preview image) obtained via the camera 530 is displayable in a reduced display region of the display 510 (e.g., "YES" in operation 605), the electronic device 101 or a processor (e.g., the processor 120 or 500) may, in operation 607, display the image (e.g., a preview image) obtained via the camera 530 in the reduced display region of the display 510. For example, the image (e.g., a preview image) obtained via the camera 530 and displayed in the reduced display region of the display 510 may be maintained at an aspect ratio and a size before change of the display area of the display 510.

According to an embodiment, the processor 500 may control the display 510 to display control objects related to the camera 530 or at least a part of the control objects to overlap with at least a part of an image obtained via the camera 530, based on reduction of the display region of the display 510. For example, the processor 500 may determine whether to display control objects related to the camera 530 or at least a part of the control objects to overlap with at least a part of an image obtained via the camera 530, based on a ratio (e.g., aspect ratio) of the image (e.g., the image obtained via the camera 530) displayed in the reduced display region of the display 510. For example, the processor 500 may, as illustrated in FIG. 7, control the display 510 to display the image 710 obtained via the camera 530 in a reduced display region 750 of the display 510. The part of the control objects 720 related to the camera 530 may be displayed in a region different from a region displaying the image in the reduced display region 750 of the display 510, based on a ratio (e.g., aspect ratio) of the image displayed in the reduced display region 750 of the display 510. The other part of the control objects 722 related to the camera 530 may be displayed to overlap with at least a part of the image 710 displayed in the reduced display region 750 of the display 510, based on a ratio (e.g., aspect ratio) of the image displayed in the reduced display region 750 of the display 510 (as indicated by reference numeral 760). For example, the image 710 displayed in the reduced display region 750 of the display 510 may be maintained at an aspect ratio and a size before change of the display area of the display 510 (as indicated by reference numeral 700). For example, the size of the control objects 720 and/or 722 related to the camera 530 may be fixed regardless of the reduced display area of the display 510, or may be changed based on the reduced display area of the display 510. For example, the processor 500 may, as illustrated in FIG. 8, control the display 510 to display the image 810 obtained via the camera 530 in a reduced display region 850 of the display 510. The control objects 820 and 822 related to the camera 530 may be displayed to overlap with at least a part of the image 810 displayed in the reduced display region 850 of the display 510, based on a ratio (e.g., aspect ratio) of the image displayed in the reduced display region 850 of the display 510 (as indicated by reference numeral 860). For example, the image 810 displayed in the reduced display region 850 of the display 510 may be maintained at an aspect ratio and a size before change of the display area of the display 510 (as indicated by reference numeral 800). For example, the size of the control objects 820 and/or 822 related to the camera 530 may be fixed regardless of the reduced display area of the display 510, or may be changed based on the reduced display area of the display 510.

According to various embodiments, in a case where it is determined that an image (e.g., a preview image) obtained via the camera 530 is not displayable in a reduced display region of the display 510 (e.g., "NO" in operation 605), the electronic device 101 or a processor (e.g., the processor 120 or 500) may, in operation 621 of FIG. 6B, identify whether a main object is detected in the image (e.g., a preview image) obtained via the camera 530. For example, the main object is a region of interest (ROI) detected and included in the image, and may be configured based on the priorities of objects detected in the image. For example, the main object may include at least one object having a relatively high priority among the objects detected in the image. For example, the priority of the object may be configured based on the priority of a category including the object. For example, the priority of the category may be configured in the order of a person (e.g., face, baby), a pet, and a thing (e.g., flowers, vehicle, and/or shoes). For example, in a case where an image includes multiple objects included in the same category, a main object may include at least one object selected, among the multiple objects, based on the size of the objects and/or the distance between the electronic device 101 and the objects.

According to various embodiments, in a case where a main object is detected in an image (e.g., a preview image) obtained via the camera 530 (e.g., "YES" in operation 621), the electronic device 101 or a processor (e.g., the processor 120 or 500) may, in operation 623, display a part of the image in a reduced display region of the display 510, based on the main object of the image. According to an embodiment, the processor 500 may, as illustrated in FIG. 9, control the display 510 to display an image 910 (e.g., a preview image) obtained via the camera 530 in a first region of a display region 900 of the display 510. The processor 500 may control the display 510 to display control objects 920 and 922 related to the camera 530 in a second region different from the first region in the display region 900 of the display 510.

According to an embodiment, in a case where it is determined that the image 910 (e.g., a preview image) obtained via the camera 530 is not displayable in a reduced display region 950 of the display 510, the processor 500 may detect a main object (e.g., "teacups") in the image 910 obtained via the camera 530. The processor 500 may control the display 510 to display a part 960 of the image 910 obtained via the camera 530 in the reduced display region 950 of the display 510, based on the main object of the image 910. For example, the part 960 of the image 910 may include a partial region cropped from the image 910 obtained via the camera 530, based on the main object of the image 910. For example, the part of control objects 920 related to the camera 530 may be displayed in a region different from a region displaying the image in the reduced display region 950 of the display 510. The other part of the control objects 922 related to the camera 530 may be displayed to overlap with the part 960 of the image 910 displayed in the reduced display region 950 of the display 510 (as indicated by reference numeral 970). For example, the image 910 displayed in the reduced display region 950 of the display 510 may be maintained at an aspect ratio and a size before change of the display area of the display 510 (as indicated by reference numeral 900).

According to an embodiment, the processor 500 may control the display 510 to display a mini map 980 including the entire image in a part of the reduced display region 950 of the display 510. For example, the mini map 980 may be displayed to overlap with the part 960 of the image 910 displayed in the display region of the display 510. For example, the mini map 980 may include a reduced image corresponding to the entirety of the image obtained via the camera 530.

According to various embodiments, in a case where a main object is not detected in an image (e.g., a preview image) obtained via the camera 530 (e.g., "NO" in operation 621), the electronic device 101 or a processor (e.g., the processor 120 or 500) may, in operation 625, reduce the size of the image obtained via the camera 530, based on a reduced display area of the display 510. For example, the reduced image may be maintained at an aspect ratio before change of the display area of the display 510. For example, an image having no main object detected therein may include a scenery image, such as mountains, sunset, sunrise, beach, sky, snow, and waterfall.

According to various embodiments, the electronic device 101 or a processor (e.g., the processor 120 or 500) may, in operation 627, display an image reduced based on a reduced display area of the display 510 in a reduced display region of the display 510. According to an embodiment, the processor 500 may, as illustrated in FIG. 10, control the display 510 to display an image 1010 (e.g., a preview image) obtained via the camera 530 in a first region of a display region 1000 of the display 510. The processor 500 may control the display 510 to display a part of control objects 1020 related to the camera 530 in a second region different from the first region in the display region 1000 of the display 510. The other part of the control objects 1022 related to the camera 530 may be displayed to overlap with the image 1010 displayed in the display region 1000 of the display 510.

According to an embodiment, in a case where it is determined that the image 1010 (e.g., a preview image) obtained via the camera 530 is not displayable in a reduced display region 1050 of the display 510, the processor 500 may detect a main object in the image 1010 obtained via the camera 530. In a case where a main object is not detected in the image 1010 obtained via the camera 530, the processor 500 may control the display 510 to display an image 1060 with a reduced image, based on a reduced display area of the display 510. For example, the control objects 1020 and 1022 related to the camera 530 may be displayed to overlap with the image 1060 displayed in the reduced display region 1050 of the display 510 (as indicated by reference numeral 1070). For example, the image 1060 reduced based on the reduced display area of the display 510 may be maintained at an aspect ratio before change of the display area of the display 510 (as indicated by reference numeral 1000).

Figure 11:
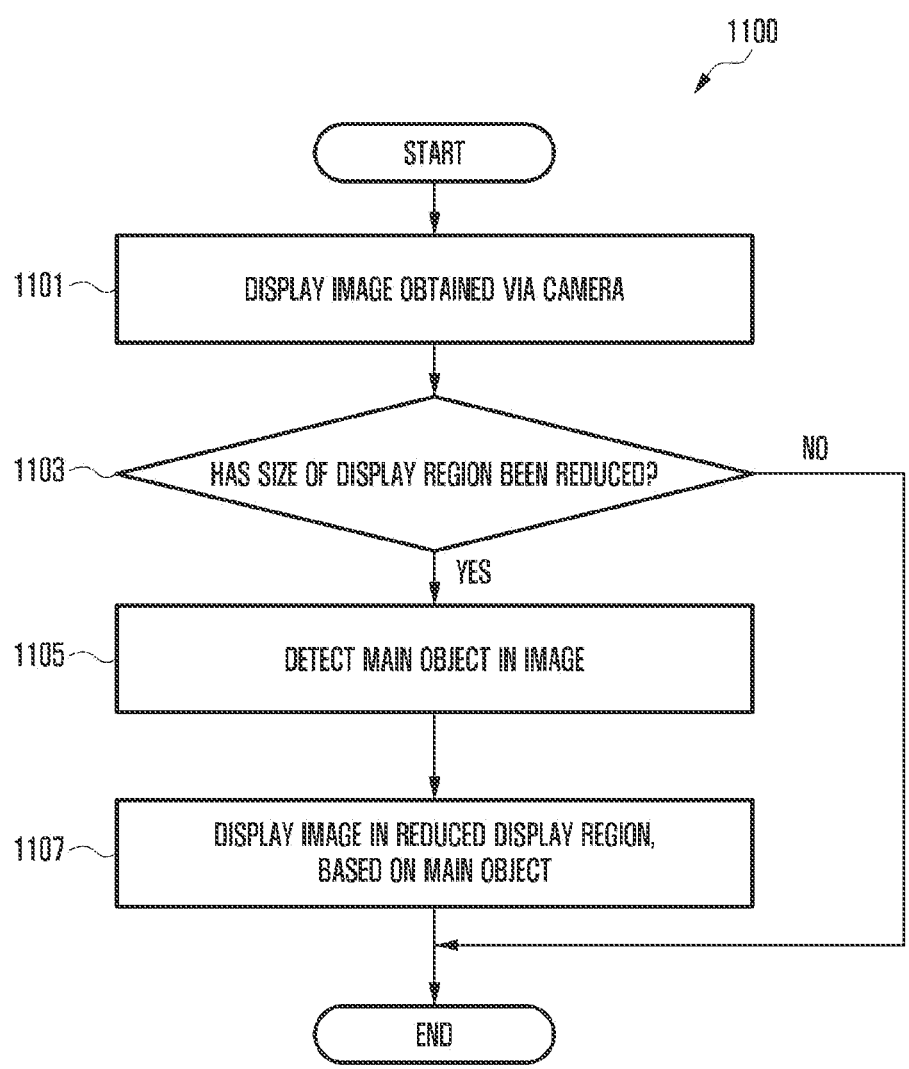
FIG. 11 is a flowchart for displaying an image, based on reduction of a display area of a flexible display in an electronic device according to an embodiment of the disclosure.

FIG. 11 is a flowchart for displaying an image, based on reduction of a display area of a flexible display in an electronic device according to an embodiment of the disclosure. In an embodiment below, operations may be sequentially performed, but the operations are not required to be necessarily sequentially performed. For example, the order of operations may be changed, and at least two operations may be performed in parallel. For example, an electronic device in FIG. 11 may be the electronic device 101 in FIG. 1, 2A, 2B, 3A, 3B, 4, or 5.

According to various embodiments referring to FIG. 11 (depicting flowchart 1100), the electronic device 101 or a processor (e.g., the processor 120 in FIG. 1 or the processor 500 in FIG. 5) may, in operation 1101, display an image (e.g., a preview image) obtained via a camera (e.g., the camera module 180 in FIG. 1 or the camera 530 in FIG. 5). According to an embodiment, in a case where the camera 530 operatively connected to the electronic device 101 is activated, the processor 500 may control the display 510 to display an image (e.g., a preview image) obtained via the camera 530. For example, control objects related to the camera 530 or a part of the control objects may be displayed to overlap with at least a part of the image or displayed in a region different from that of the image, based on a display area of the display 510. For example, the size of the image obtained via the camera 530 may be configured based on the size (e.g., a display area) of the display region of the display 510 at a time point of displaying the image. For example, the aspect ratio of the image obtained via the camera 530 may be configured based on a user input or a pre-defined configuration of the camera 530, or may be configured based on the size (e.g., a display area) of the display region of the display 510.

According to various embodiments, the electronic device 101 or a processor (e.g., the processor 120 or 500) may, in operation 1103, identify whether the size (e.g., a display area) of a display region of the display 510 is reduced. According to an embodiment, in a case where a triggering operation for changing the display area of the display 510 is detected, the processor 500 may operate the drive module 520 to change (e.g., enlarge or reduce) the display area of the display 510. According to an embodiment, the processor 500 may detect a changed display area of the display 510, based on a distance by which the first housing 210 has been moved from the second housing 220 through the operation of the drive module 520. The processor 500 may determine whether the display area of the display 510 has been reduced, based on the changed display area of the display 510. For example, the changed display area of the display 510 may include a display area of the display 510, detected at a time point (e.g., a time point of completion of driving of the drive module 520) of completion of the change of the display area of the display 510. For example, the changed display area of the display 510 may be periodically detected based on a designated period while the display area of the display 510 is changed (e.g., the drive module 520 is driven).

According to various embodiments, in a case where the size (e.g., a display area) of a display region of the display 510 has not been reduced (e.g., "NO" in operation 1103), the electronic device 101 or a processor (e.g., the processor 120 or 500) may terminate an embodiment for displaying an image, based on reduction of the display area of the display 510. According to an embodiment, in a case where the size (e.g., a display area) of a display region of the display 510 is maintained, the processor 500 may terminate an embodiment for displaying an image, based on change of the display area of the display 510. According to an embodiment, in a case where the size (e.g., a display area) of a display region of the display 510 is expanded, the processor 500 may control the display 510 to display an image, based on the expanded display area of the display 510, as illustrated in FIG. 12 or 13.

According to various embodiments, in a case where the size (e.g., a display area) of a display region of the display 510 has been reduced (e.g., "YES" in operation 1103), the electronic device 101 or a processor (e.g., the processor 120 or 500) may, in operation 1105, detect a main object in an image (e.g., a preview image) obtained via the camera 530. For example, the main object is a region of interest (ROI) detected and included in the image, and may be configured based on the priorities of objects detected in the image. For example, the main object may include at least one object having a relatively high priority among the objects detected in the image. For example, the priority of the object may be configured based on the priority of a category including the object. For example, the priority of the category may be configured in the order of a person (e.g., face, baby), a pet, and a thing (e.g., flowers, vehicle, and/or shoes). For example, in a case where an image includes multiple objects included in the same category, a main object may include at least one object selected, among the multiple objects, based on the size of the objects and/or the distance between the electronic device 101 and the objects.

According to various embodiments, the electronic device 101 or a processor (e.g., the processor 120 or 500) may, in operation 1107, display a part of an image in a reduced display region of the display 510, based on a main object of the image. According to an embodiment, the processor 500 may control the display 510 to display the part 960 of the image 910 obtained via the camera 530 in the reduced display region 950 of the display 510, based on a main object (e.g., "teacups") of the image 910 obtained via the camera 530, as illustrated in FIG. 9. For example, the image 910 displayed in the reduced display region 950 of the display 510 may be maintained at an aspect ratio and a size before change of the display area of the display 510 (as indicated by reference numeral 900). For example, the mini map 980 including the image 910 obtained via the camera 530 may be displayed to at least partially overlap with the part 960 of the image 910 in a part of the reduced display region 950 of the display 510. For example, control objects related to the camera 530 or a part of the control objects may be displayed to overlap with the part 960 of the image 910 or displayed in a region different from that of the part 960 of the image 910, based on the reduced display area of the display 510.

According to various embodiments, in a case where a main object is not detected in an image (e.g., a preview image) obtained via the camera 530 (e.g., a scenery image), the electronic device 101 may reduce the size of the image obtained via the camera 530, based on a reduced display area of the display 510. The electronic device 101 or a processor (e.g., the processor 500) may display an image reduced based on the reduced display area of the display 510 in a reduced display region of the display 510. For example, the reduced image may be maintained at an aspect ratio before change of the display area of the display 510.

FIG. 12 is a flowchart for displaying an image, based on expansion of a display area of a flexible display in an electronic device according to an embodiment of the disclosure. In an embodiment below, operations may be sequentially performed, but the operations are not required to be necessarily sequentially performed. For example, the order of operations may be changed, and at least two operations may be performed in parallel. For example, an electronic device in FIG. 12 may be the electronic device 101 in FIG. 1, 2A, 2B, 3A, 3B, 4, or 5.

According to various embodiments, referring to FIG. 12 (depicting flowchart 1200), the electronic device 101 or a processor (e.g., the processor 120 in FIG. 1 or the processor 500 in FIG. 5) may, in operation 1201, display an image (e.g., a preview image) obtained via a camera (e.g., the camera module 180 in FIG. 1 or the camera 530 in FIG. 5). According to an embodiment, in a case where the camera 530 operatively connected to the electronic device 101 is activated, the processor 500 may control the display 510 to display the image (e.g., a preview image) obtained via the camera 530. Control objects related to the camera 530 or a part of the control objects may be displayed to overlap with at least a part of the image or displayed in a region different from that of the image, based on a display area of the display 510. For example, the image 710 (e.g., a preview image) obtained via the camera 530 may be displayed in the display region 750 of the display 510 or a part of the display region 750, as illustrated in FIG. 7. The part of the control objects 720 related to the camera 530 may be displayed in a region different from that of the image 710 in the display region 750 of the display 510. The other part of the control objects 722 related to the camera 530 may be displayed to at least partially overlap with the image 710 displayed in the display region 750 of the display 510 (as indicated by reference numeral 760).

According to various embodiments, the electronic device 101 or a processor (e.g., the processor 120 or 500) may, in operation 1203, identify whether the size (e.g., a display area) of a display region of the display 510 is expanded. According to an embodiment, in a case where a triggering operation for changing the display area of the display 510 is detected, the processor 500 may operate the drive module 520 to change (e.g., enlarge or reduce) the display area of the display 510. According to an embodiment, the processor 500 may detect a changed display area of the display 510, based on a distance by which the first housing 210 has been moved from the second housing 220 through the operation of the drive module 520. The processor 500 may determine whether the display area of the display 510 has been expanded, based on the changed display area of the display 510. For example, the changed display area of the display 510 may include a display area of the display 510, detected at a time point (e.g., a time point of completion of driving of the drive module 520) of completion of the change of the display area of the display 510. For example, the changed display area of the display 510 may be periodically detected based on a designated period while the display area of the display 510 is changed (e.g., the drive module 520 is driven).

According to various embodiments, in a case where the size (e.g., a display area) of a display region of the display 510 has not been expanded (e.g., "NO" in operation 1203), the electronic device 101 or a processor (e.g., the processor 120 or 500) may terminate an embodiment for displaying an image, based on expansion of the display area of the display 510. According to an embodiment, in a case where the size (e.g., a display area) of a display region of the display 510 is maintained, the processor 500 may terminate an embodiment for displaying an image, based on change of the display area of the display 510. According to an embodiment, in a case where the size (e.g., a display area) of a display region of the display 510 is reduced, the processor 500 may control the display 510 to display an image, based on the reduced display area of the display 510, as illustrated in FIGS. 6A and 6B or FIG. 11.

According to various embodiments, in a case where the size (e.g., a display area) of a display area of the display 510 is enlarged (e.g., "YES" in operation 1203), the electronic device 101 or a processor (e.g., the processor 120 or 500) may identify, in operation 1205, whether control objects related to the camera 530 or a part of the control objects has been displayed to overlap with an image (e.g., a preview image) obtained via the camera 530, through a display region of the display 510 before the change (e.g., expansion) of the display area.

According to various embodiments, in a case where control objects related to the camera 530 or a part of the control objects is displayed to overlap with an image (e.g., a preview image) obtained via the camera 530 (e.g., "YES" in operation 1205), the electronic device 101 or a processor (e.g., the processor 120 or 500) may, in operation 1207, display the control objects related to the camera 530 or the part of the control objects, and the image (e.g., a preview image) obtained via the camera 530 in different regions, based on an expanded display area of the display 510.

According to an embodiment, the processor 500 may, as illustrated in FIG. 7, display the image 710 (e.g., a preview image) obtained via the camera 530 in the expanded display region 700 of the display 510. The control objects 720 and 722 related to the camera 530 may be displayed in a region different from that of the image 710 in the expanded display region 700 of the display 510, based on the expansion of the display area of the display 510. For example, the image displayed in the expanded display region 700 of the display 510 may be maintained at an aspect ratio and a size before change of the display area of the display 510 (as indicated by reference numeral 750). For example, the image displayed in the expanded display region 700 of the display 510 may be maintained at an aspect ratio before change of the display area of the display 510 (as indicated by reference numeral 750), and the size of the image may be enlarged based on the expanded display area of the display 510.

According to various embodiments, in a case where a control object related to the camera 530 does not overlap with in an image (e.g., a preview image) obtained via the camera 530 (e.g., "NO" in operation 1205), the electronic device 101 or a processor (e.g., the processor 120 or 500) may, in operation 1209, expand the size of the image obtained via the camera 530, based on an expanded display area of the display 510. For example, the enlarged image may be maintained at an aspect ratio before change of the display area of the display 510.

According to various embodiments, the electronic device 101 or a processor (e.g., the processor 120 or 500) may, in operation 1211, display an image expanded based on an expanded display area of the display 510 in an expanded display region of the display 510.

FIG. 13 is a flowchart for displaying a main object of an image, based on expansion of a display area of a flexible display in an electronic device according to an embodiment of the disclosure. In an embodiment below, operations may be sequentially performed, but the operations are not required to be necessarily sequentially performed. For example, the order of operations may be changed, and at least two operations may be performed in parallel. For example, an electronic device in FIG. 13 may be the electronic device 101 in FIG. 1, 2A, 2B, 3A, 3B, 4, or 5.

According to various embodiments referring to FIG. 13 (depicting flowchart 1300), the electronic device 101 or a processor (e.g., the processor 120 in FIG. 1 or the processor 500 in FIG. 5) may, in operation 1301, display an image (e.g., a preview image) obtained via a camera (e.g., the camera module 180 in FIG. 1 or the camera 530 in FIG. 5). According to an embodiment, in a case where the camera 530 operatively connected to the electronic device 101 is activated, the processor 500 may control the display 510 to display an image (e.g., a preview image) obtained via the camera 530. Control objects related to the camera 530 or a part of the control objects may be displayed to overlap with at least a part of the image or displayed in a region different from that of the image, based on a display area of the display 510. For example, the camera 530 may be activated based on at least one of selection (e.g., a touch) of an object (e.g., an icon) displayed on the display 510 and related to the camera 530, manipulation of a physical button (e.g., a key button) included in the electronic device 101, execution of a function or an application program related to the camera 530, a voice input, or reception of a wireless signal related to the camera 530.

According to various embodiments, the electronic device 101 or a processor (e.g., the processor 120 or 500) may, in operation 1303, identify whether the size (e.g., a display area) of a display region of the display 510 is expanded. According to an embodiment, in a case where a triggering operation for changing the display area of the display 510 is detected, the processor 500 may operate the drive module 520 to change (e.g., enlarge or reduce) the display area of the display 510. According to an embodiment, the processor 500 may detect a changed display area of the display 510, based on a distance by which the first housing 210 has been moved from the second housing 220 through the operation of the drive module 520. The processor 500 may determine whether the display area of the display 510 has been expanded, based on the changed display area of the display 510. For example, the changed display area of the display 510 may include a display area of the display 510, detected at a time point (e.g., a time point of completion of driving of the drive module 520) of completion of the change of the display area of the display 510. For example, the changed display area of the display 510 may be periodically detected based on a designated period while the display area of the display 510 is changed (e.g., the drive module 520 is driven). For example, the triggering operation may include at least one of selection (e.g., a touch) of an object displayed on the display 510, manipulation of a physical button (e.g., a key button) included in the electronic device 101, execution of a function or an application program related to triggering, a voice input, or reception of a wireless signal related to triggering.

According to various embodiments, in a case where the size (e.g., a display area) of a display region of the display 510 has not been expanded (e.g., "NO" in operation 1303), the electronic device 101 or a processor (e.g., the processor 120 or 500) may terminate an embodiment for displaying a main object of an image, based on expansion of the display area of the display 510. According to an embodiment, in a case where the size (e.g., a display area) of a display region of the display 510 is maintained, the processor 500 may terminate an embodiment for displaying a main object of an image, based on change of the display area of the display 510. According to an embodiment, in a case where the size (e.g., a display area) of a display region of the display 510 is reduced, the processor 500 may control the display 510 to display an image, based on the reduced display area of the display 510, as illustrated in FIGS. 6A and 6B or FIG. 11.

According to various embodiments, in a case where the size (e.g., a display area) of a display region of the display 510 has been expanded (e.g., "YES" in operation 1303), the electronic device 101 or a processor (e.g., the processor 120 or 500) may, in operation 1305, identify whether a main object is detected in an image (e.g., a preview image) obtained via the camera 530. For example, the main object is a region of interest (ROI) detected and included in the image, and may be configured based on the priorities of objects detected in the image. For example, the main object may include at least one object having a relatively high priority among the objects detected in the image. For example, the priority of the object may be configured based on the priority of a category including the object. For example, the priority of the category may be configured in the order of a person (e.g., face, baby), a pet, and a thing (e.g., flowers, vehicle, and/or shoes). For example, in a case where an image includes multiple objects included in the same category, a main object may include at least one object selected, among the multiple objects, based on the size of the objects and/or the distance between the electronic device 101 and the objects.

According to various embodiments, in a case where a main object is detected in an image (e.g., a preview image) obtained via the camera 530 (e.g., "YES" in operation 1305), the electronic device 101 or a processor (e.g., the processor 120 or 500) may, in operation 1307, display the main object of the image in a central region of an expanded display region of the display 510. For example, the central region of the expanded display region of the display 510 may include at least a partial region in the middle of the expanded display region of the display 510. For example, the image displayed in the expanded display region of the display 510 may be maintained at an aspect ratio and a size before change of the display area of the display 510. For example, the image displayed in the expanded display region of the display 510 may be maintained at an aspect ratio before change of the display area of the display 510, and the size of the image may be enlarged based on the expanded display area of the display 510.

According to various embodiments, in a case where a main object is not detected in an image (e.g., a preview image) obtained via the camera 530 (e.g., "NO" in operation 1305), the electronic device 101 or a processor (e.g., the processor 120 or 500) may, in operation 1309, expand the size of the image obtained via the camera 530, based on an expanded display area of the display 510. For example, the enlarged image may be maintained at an aspect ratio before change of the display area of the display 510.

According to various embodiments, the electronic device 101 or a processor (e.g., the processor 120 or 500) may, in operation 1311, display an image expanded based on an expanded display area of the display 510 in an expanded display region of the display 510.

According to an embodiment, the electronic device 101 may display an image obtained via the camera 530 in the expanded display region of the display 510 while maintaining the position displaying the image. According to an embodiment, the processor 500 may control the display 510 to display the main object of the image in at least a partial region of the expanded display region of the display 510, which corresponds to a position at which the main object has been displayed before expansion of the display area of the display 510.

According to various embodiments, the electronic device 101 may change a display area of the display 510 to different sizes. According to an embodiment, the display region of the display 510 may have a first display area in a state where the first housing 210 has been slid in the second housing 220. For example, a slide-in state may include a state in which the first housing 210 is completely accommodated in the second space 2201 of the second housing 220. According to an embodiment, the display region of the display 510 may have a third display area greater than the first display area in a state where the first housing 210 has been slid in the second housing 220 in an intermediate mode. For example, a slide-in state using an intermediate mode may include a state in which the first housing 210 is accommodated in a part of the second space 2201 of the second housing 220. According to an embodiment, the display region of the display 510 may have a second display area greater than the first display area and the third display area in a state where the first housing 210 has been slid out of the second housing 220. For example, a slide-out state may include a state in which the first housing 210 has escaped from the second space 2201 of the second housing 220.

According to various embodiments, the electronic device 101 may differently apply a scheme of displaying an image obtained via the camera 530, based on various display areas of the display 510.

Figure 14:
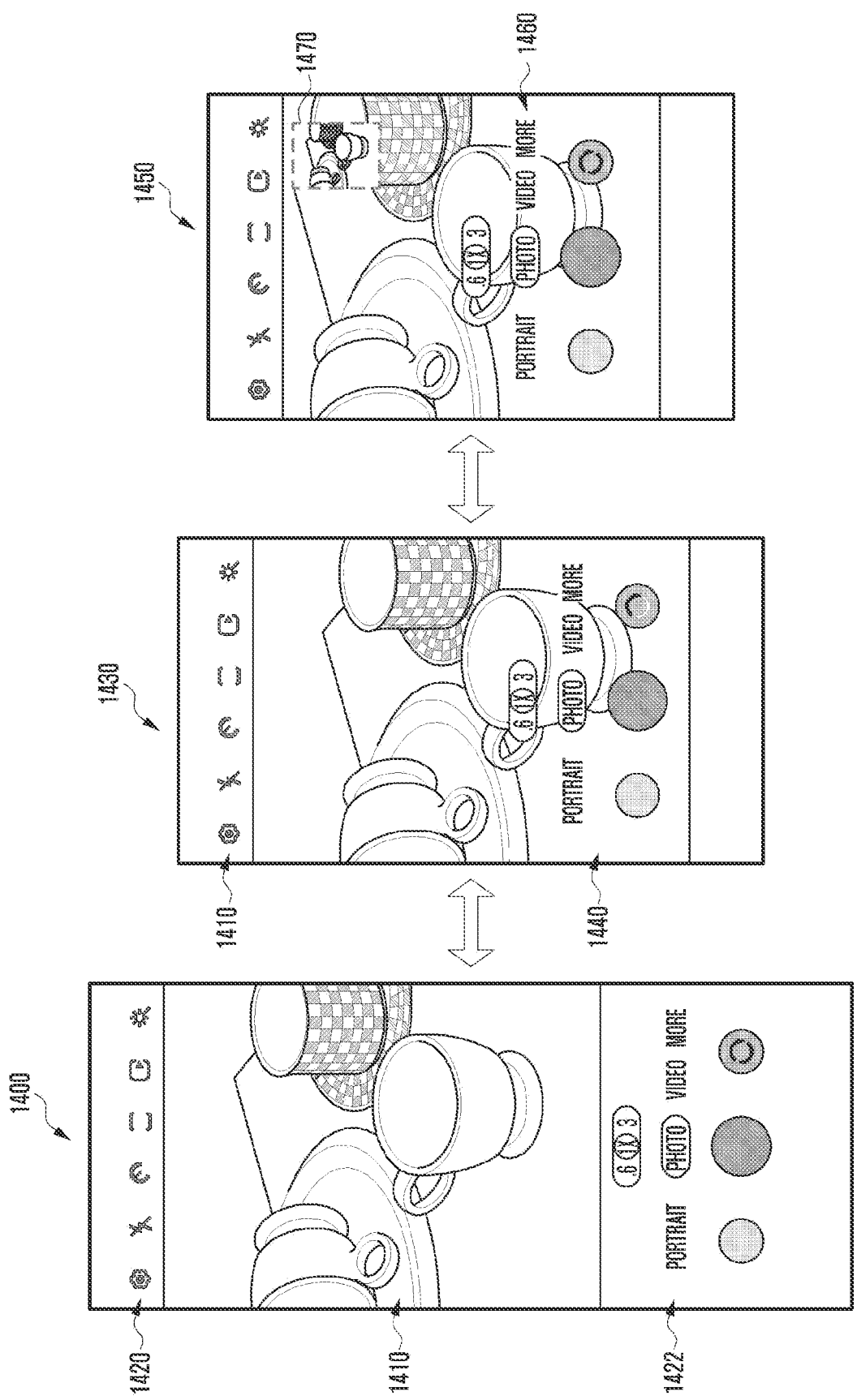
FIG. 14 is an example for displaying an image, based on a display area of a flexible display in an electronic device according to an embodiment of the disclosure.

FIG. 14 is an example for displaying an image, based on a display area of a flexible display in an electronic device according to an embodiment of the disclosure.

According to various embodiments referring to FIG. 14, in a case where the camera 530 is activated, the electronic device 101 may display an image 1410 (e.g., a preview image) obtained via the camera 530 in at least a part of a display region 1400 of the display 510. For example, the size of the image obtained via the camera 530 may be configured based on the size (e.g., a display area) of the display region 1400 of the display 510 at a time point of displaying the image. For example, the aspect ratio of the image obtained via the camera 530 may be configured based on a user input or a pre-defined configuration of the camera 530, or may be configured based on the size (e.g., a display area) of the display region of the display 510. According to an embodiment, control objects 1420 and 1422 related to the camera 530 may be displayed in a region different from that of the image 1410 obtained via the camera 530 in the display region 1400 of the display 510.

According to various embodiments, in a case where the size (e.g., a display area) of the display region of the display 510 has been reduced to the third display area, the electronic device 101 may identify whether the entirety of the image (e.g., a preview image) obtained via the camera 530 is displayable in a reduced display region 1430 of the display 510. According to an embodiment, in a case where it is determined that the entirety of the image (e.g., a preview image) obtained via the camera 530 is displayable in the reduced display region 1430 of the display 510, the electronic device 101 may display the image 1410 (e.g., a preview image) obtained via the camera 530 in at least a part of the reduced display region 1430 of the display 510. For example, the image 1410 displayed in the reduced display region 1430 of the display 510 may be maintained at an aspect ratio and a size before change of the display area of the display 510 (as indicated by reference numeral 1400).

According to an embodiment, the electronic device 101 may display the control objects related to the camera 530 or a part of the control objects to at least partially overlap with the image 1410 displayed in the reduced display region 1430 of the display 510, based on the reduced display area of the display 510. For example, the part of the control objects 1420 related to the camera 530 may be displayed in a region different from a region displaying the image 1410 in the reduced display region 1430 of the display 510. The other part of the control objects 1422 related to the camera 530 may be displayed to at least partially overlap with the image 1410 displayed in the reduced display region 1430 of the display 510 (as indicated by reference numeral 1440).

According to various embodiments, in a case where the size (e.g., a display area) of the display region of the display 510 has been reduced to the first display area, the electronic device 101 may identify whether the entirety of the image (e.g., a preview image) obtained via the camera 530 is displayable in a reduced display region 1450 of the display 510. According to an embodiment, in a case where it is determined that the entirety of the image (e.g., a preview image) obtained via the camera 530 is not displayable in the reduced display region 1450 of the display 510, the electronic device 101 may detect a main object (e.g., "teacups") in the image 1410 (e.g., a preview image) obtained via the camera 530. The electronic device 101 may display a part 1460 of the image 1410 obtained via the camera 530 in the reduced display region 1450 of the display 510, based on the main object of the image 1410. For example, the image 1410 displayed in the reduced display region 1450 of the display 510 may be maintained at an aspect ratio and a size before change of the display area of the display 510 (as indicated by reference numeral 1430).

According to an embodiment, the processor 500 may display a mini map 1470 including the entire image in a part of the reduced display region 1450 of the display 510. For example, the mini map 1470 may be displayed to at least partially overlap with the part 1460 of the image 1410 displayed in the reduced display region 1450 of the display 510. For example, the mini map 1470 may include a reduced image corresponding to the entirety of the image obtained via the camera 530.

According to an embodiment, the electronic device 101 may display the control objects related to the camera 530 or a part of the control objects to at least partially overlap with the part 1460 of the image 1410 displayed in the reduced display region 1450 of the display 510, based on the reduced display area of the display 510. For example, the part of the control objects 1420 related to the camera 530 may be displayed in a region different from a region displaying the part 1460 of the image 1410 in the reduced display region 1450 of the display 510. The other part of the control objects 1422 related to the camera 530 may be displayed to overlap with the part 1460 of the image 1410 displayed in the reduced display region 1450 of the display 510. For example, the control objects 1420 and/or 1422 related to the camera 530 may be displayed at a fixed size regardless of the change (e.g., reduction or expansion) of the display area of the display 510, or may be displayed at a size changed based on change (e.g., reduction or expansion) of the display area of the display 510.

Figure 15:
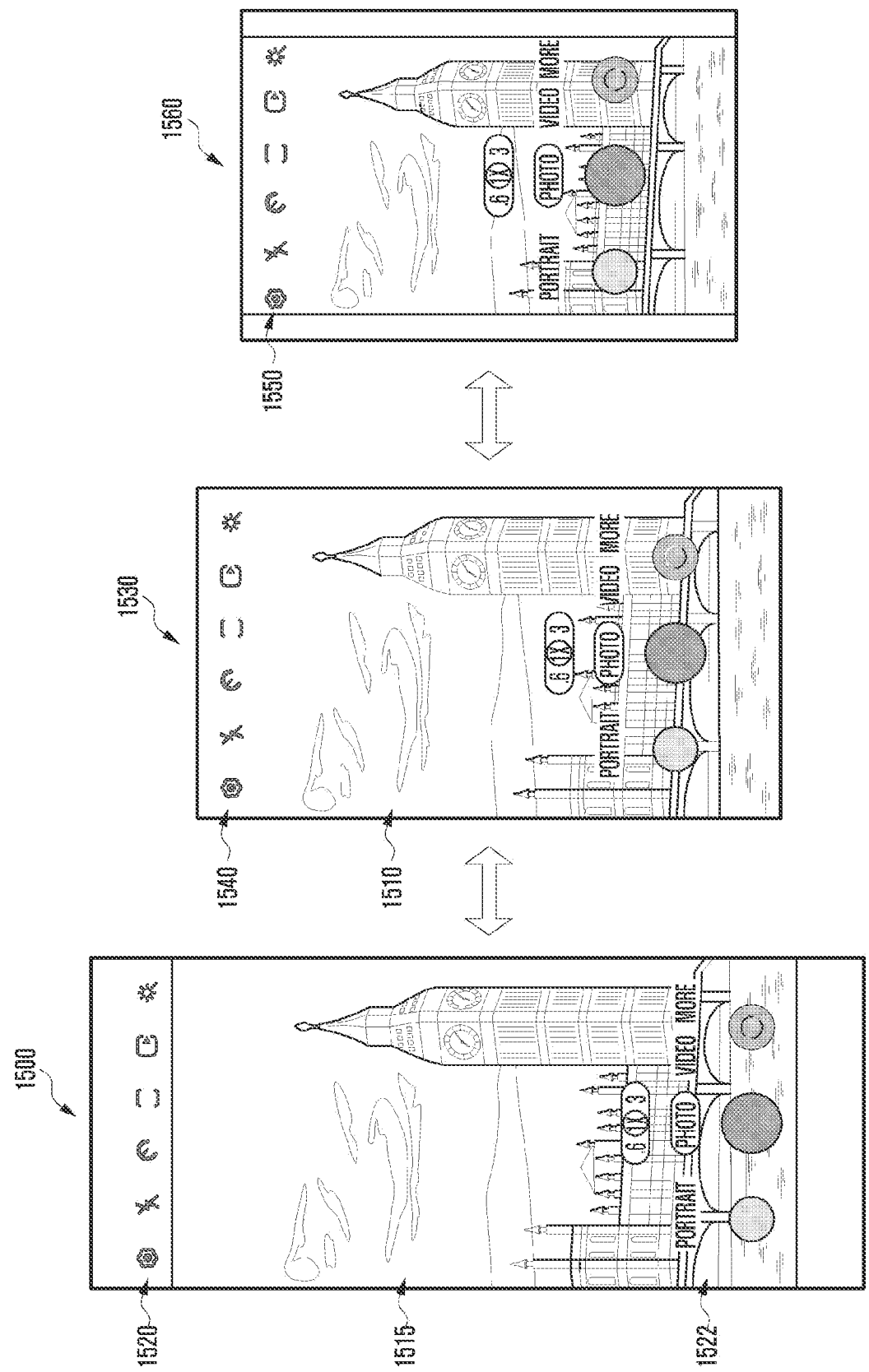
FIG. 15 is another example for displaying an image, based on a display area of a flexible display in an electronic device according to an embodiment of the disclosure.

FIG. 15 is another example for displaying an image, based on a display area of a flexible display in an electronic device according to an embodiment of the disclosure.

According to various embodiments, referring to FIG. 15, in a case where the camera 530 is activated, the electronic device 101 may display an image 1515 (e.g., a preview image) obtained via the camera 530 in at least a part of a display region 1500 of the display 510. For example, the size of the image obtained via the camera 530 may be configured based on the size (e.g., a display area) of the display region of the display 510 at a time point of displaying the image. For example, the aspect ratio of the image obtained via the camera 530 may be configured based on a user input or a pre-defined configuration of the camera 530, or may be configured based on the size (e.g., a display area) of the display region of the display 510. According to an embodiment, a part of control objects 1520 related to the camera 530 may be displayed in a region different from that of an image 1510 obtained via the camera 530 in the display region 1500 of the display 510. The other part of the control objects 1522 related to the camera 530 may be displayed to at least partially overlap with the image 1510 obtained via the camera 530 and displayed in the display region 1500 of the display 510.

According to various embodiments, in a case where the size (e.g., a display area) of the display region of the display 510 has been reduced to the third display area, the electronic device 101 may identify whether the entirety of the image (e.g., a preview image) obtained via the camera 530 is displayable in a reduced display region 1530 of the display 510. According to an embodiment, in a case where it is determined that the entirety of the image (e.g., a preview image) obtained via the camera 530 is displayable in the reduced display region 1530 of the display 510, the electronic device 101 may display the image 1510 (e.g., a preview image) obtained via the camera 530 in at least a part of the reduced display region 1530 of the display 510. For example, the image 1510 displayed in the reduced display region 1530 of the display 510 may be maintained at an aspect ratio and a size before change of the display area of the display 510 (as indicated by reference numeral 1500).

According to an embodiment, the electronic device 101 may display the control objects related to the camera 530 or a part of the control objects to at least partially overlap with the image 1510 displayed in the reduced display region 1530 of the display 510, based on the reduced display area of the display 510. For example, the control objects 1520 and 1522 related to the camera 530 may be displayed to at least partially overlap with the image 1510 displayed in the reduced display region 1530 of the display 510 (as indicated by reference numeral 1540).

According to various embodiments, in a case where the size (e.g., a display area) of the display region of the display 510 has been reduced to the first display area, the electronic device 101 may identify whether the entirety of the image (e.g., a preview image) obtained via the camera 530 is displayable in a reduced display region 1550 of the display 510. According to an embodiment, in a case where it is determined that the entirety of the image (e.g., a preview image) obtained via the camera 530 is not displayable in the reduced display region 1530 of the display 510, the electronic device 101 may detect a main object in the image 1510 (e.g., a preview image) obtained via the camera 530.

According to an embodiment, in a case where a main object fails to be detected in the image 1510 (e.g., a preview image) obtained via the camera 530, the electronic device 101 may reduce (as indicated by reference numeral 1560) the size of the image 1510 obtained via the camera 530, and display the reduced image in the reduced display region 1550 of the display 510. For example, a reduced image 1560 displayed in the reduced display region 1550 of the display 510 may be maintained at an aspect ratio before change of the display area of the display 510 (as indicated by reference numeral 1530).

According to an embodiment, the electronic device 101 may display the control objects related to the camera 530 or a part of the control objects to at least partially overlap with the reduced image 1560 displayed in the reduced display region 1550 of the display 510, based on the reduced display area of the display 510. For example, the control objects 1520 and 1522 related to the camera 530 may be displayed to at least partially overlap with the reduced image 1560 displayed in the reduced display region 1550 of the display 510. For example, the control objects 1520 and/or 1522 related to the camera 530 may be displayed at a fixed size regardless of the change (e.g., reduction or expansion) of the display area of the display 510, or may be displayed at a size changed based on change (e.g., reduction or expansion) of the display area of the display 510.

According to various embodiments, an operation method of an electronic device (e.g., the electronic device 101 in FIG. 1, 2A, 2B, 3A, 3B, 4, or 5) including a flexible display (e.g., the display device 160 in FIG. 1, the flexible display 230 in FIGS. 2A, 2B, 3A, 3B, and 4, or the display 510 in FIG. 5) having a changeable display area may include displaying an image obtained via a camera of the electronic device in at least a part of the display region of the flexible display, in case that reduction of the display region of the flexible display is detected, comparing a size of the reduced display region of the flexible display and a size of the image, and displaying the image in the reduced display region of the flexible display while maintaining an aspect ratio and the size of the image, based on a result of the comparison, wherein control objects related to the camera are displayed to overlap with the image displayed in the reduced display region of the flexible display.

According to various embodiments, the displaying in the reduced display region of the flexible display may include identifying whether an entirety of the image is displayable in the reduced display region of the flexible display, based on the result of the comparison, and in case that it is determined that the entirety of the image is displayable in the reduced display region of the flexible display, displaying the image in the reduced display region of the flexible display while maintaining the aspect ratio and the size of the image.

According to various embodiments, the method may further include, in case that it is determined that a part of the image is displayable in the reduced display region of the flexible display, detecting a main object in the image, and while maintaining the aspect ratio and the size of the image, displaying the part of the image in the reduced display region of the flexible display, based on the main object of the image, and a reduced image corresponding to the image may be displayed in a part of the reduced display region of the flexible display.

According to various embodiments, the method may further include, in case that the main object is not detected in the image, while maintaining the aspect ratio of the image, reducing the size of the image, based on a size of the reduced display region of the flexible display, and displaying the image having the reduced size in the reduced display region of the flexible display.

According to various embodiments, the method may further include, in case that expansion of the size of the display region of the flexible display is detected in a state where the image is displayed in the reduced display region of the flexible display, displaying the image in a third region of the expanded display region of the flexible display, wherein at least a part of the control objects related to the camera is displayed in a fourth region different from the third region in the display region.

According to various embodiments, the method may further include, in case that expansion of the size of the display region of the flexible display is detected in a state where the image is displayed in the reduced display region of the flexible display, detecting a main object in the image, and while maintaining the aspect ratio of the image, displaying the image in the expanded display region of the flexible display, based on the main object of the image.

According to various embodiments, the image displayed in the expanded display region of the flexible display may be expanded based on a size of the expanded display region of the flexible display while the aspect ratio of the image is maintained.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   memory storing instructions;
   a camera;
   a housing including a second housing part and a first housing part configured to movably engage with the second housing part between a retracted position and an extended position;
   a flexible display coupled to the first housing part such that a size of an area of the flexible display visible from a front side of the housing changes between the retracted position and the extended position of the housing; and
   at least one processor operatively connected to the camera and the flexible display,
   wherein the instructions which, when executed by the at least one processor, cause the electronic device to:
      display an image obtained via the camera in at least a part of the area of the flexible display,
      in response to detecting a reduction in the size of the area of the flexible display, compare the reduced size of the area of the flexible display to a size of the image,
      based on a result of the comparing, identify whether an entirety of the image is displayable in the reduced area of the flexible display,
      in response to determining that the entirety of the image is displayable in the reduced area of the flexible display, display the image in the reduced area of the flexible display while maintaining an aspect ratio and the size of the image,
      wherein control objects related to the camera at least partially overlap the image displayed in the reduced area of the flexible display, and
      in response to determining that the entirety of the image is not displayable in the reduced area of the flexible display, display a part of the image in the reduced area of the flexible display while maintaining the aspect ratio and the size of the image or a reduced image in the reduced area of the flexible display.

2. The electronic device of claim 1, wherein the instructions which, when executed by the at least one processor, cause the electronic device to:
   in response to detecting a reduction in the size of the area of the flexible display, compare the size and an aspect ratio of the reduced area of the flexible display to the size and an aspect ratio of the image.

3. The electronic device of claim 1, wherein the instructions which, when executed by the at least one processor, cause the electronic device to:
   in response to determining that the entirety of the image is not displayable in the reduced area of the flexible display, detect a main object in the image, and
   based on the main object detected in the image, display the part of the image in the reduced area of the flexible display while maintaining the aspect ratio and the size of the image.

4. The electronic device of claim 3, wherein the instructions which, when executed by the at least one processor, cause the electronic device to:
   based on the main object not being detected in the image, reduce the size of the image to a reduced size based on the size of the reduced area of the flexible display while maintaining the aspect ratio of the image, and
   display the reduced image in the reduced area of the flexible display.

5. The electronic device of claim 1, wherein the memory storing instructions which, when executed by the at least one processor, cause the electronic device to:
   in response to detecting an extension of the size of the area of the flexible display to an extended area in a state in which the image is displayed in the reduced area of the flexible display, display the image in a third region of the extended area of the flexible display, and
   display at least a part of the control objects related to the camera in a fourth region of the extended area different from the third region.

6. The electronic device of claim 1, wherein the instructions which, when executed by the at least one processor, cause the electronic device to:
   in response to detecting an extension of the size of the area of the flexible display to an extended area in a state in which the image is displayed in the reduced area of the flexible display, detect a main object in the image, and based on the main object detected in the image, display the image in the extended area of the flexible display while maintaining the aspect ratio of the image.

7. The electronic device of claim 6, wherein the image displayed in the extended area of the flexible display is extended based on a size of the extended area of the flexible display while the aspect ratio of the image is maintained.

8. The electronic device of claim 1,
wherein the size of the area of the flexible display is extended in response to at least part of the first housing transitioning to a slide-out state from a slide-in state of being accommodated in a space of the second housing, and
wherein, in response to the at least part of the first housing transitioning from the slide-out state to the slide-in state, the size of the area is reduced.

9. A method of operation of an electronic device including a flexible display in which a size of an area visible a front of a housing changes between a retracted position and an extended position of the housing, the method comprising:
displaying an image obtained via a camera of the electronic device in at least a part of the area of the flexible display;
in response to detecting a reduction in the size of the area of the flexible display, comparing the reduced size of the area of the flexible display to a size of the image;
based on a result of the comparing, identifying whether an entirety of the image is displayable in the reduced area of the flexible display;
in response to determining that the entirety of the image is displayable in the reduced area of the flexible display, displaying the image in the reduced area of the flexible display while maintaining an aspect ratio and the size of the image, wherein control objects related to the camera at least partially overlap the image displayed in the reduced area of the flexible display; and
in response to determining that the entirety of the image is not displayable in the reduced area of the flexible display, displaying a part of the image in the reduced area of the flexible display while maintaining the aspect ratio and the size of the image or a reduced image in the reduced area of the flexible display.

10. The method of claim 9, wherein the displaying of the image in the reduced area of the flexible display comprises:
in response to detecting a reduction in the size of the area of the flexible display, comparing the size and an aspect ratio of the reduced area of the flexible display to the size and an aspect ratio of the image.

11. The method of claim 9, wherein the displaying of the part of the image comprising:
in response to determining that the entirety of the image is not displayable in the reduced area of the flexible display, detecting a main object in the image; and
based on the main object detected in the image, displaying the part of the image in the reduced area of the flexible display while maintaining the aspect ratio and the size of the image; and
displaying a reduced image corresponding to the image in a part of the reduced area of the flexible display.

12. The method of claim 11, wherein the displaying of the part of the image comprising:
based on the main object not being detected in the image, reducing the size of the image to a reduced size based on the size of the reduced area of the flexible display while maintaining the aspect ratio of the image; and
displaying the reduced image in the reduced area of the flexible display.

13. The method of claim 9, further comprising:
in response to detecting an extension of the size of the area of the flexible display to an extended area in a state in which the image is displayed in the reduced area of the flexible display, displaying the image in a third region of the extended area of the flexible display; and
displaying at least a part of the control objects related to the camera in a fourth region of the extended area different from the third region.

14. The method of claim 9, further comprising:
in response to detecting an extension of the size of the area of the flexible display to an extended area in a state in which the image is displayed in the reduced area of the flexible display, detecting a main object in the image; and
based on the main object detected in the image, displaying the image in the extended area of the flexible display while maintaining the aspect ratio of the image.

15. The method of claim 14, wherein the image displayed in the extended area of the flexible display is extended based on a size of the extended area of the flexible display while the aspect ratio of the image is maintained.

16. The method of claim 14,
wherein the main object comprises a region of interest (ROI) detected and included in the image,
wherein the main object includes at least one object having a higher priority among priorities of objects detected in the image,
wherein the priorities of objects are based on a priority of a category including a corresponding object.

17. The method of claim 16, further comprising:
in response to the image having multiple objects in a same category, selecting the main object among the multiple objects based on at least one of a size of each of the multiple objects or a distance between the electronic device and each of the multiple objects.

18. The method of claim 9,
wherein the control objects are icons corresponding to commands, respectively, related to driving the camera,
wherein the control objects include at least one of a setting menu related to image acquisition using the camera, an image capturing button, or an image identification button, and
wherein the setting menu related to image acquisition includes a menu related to at least one setting among a flash setting, a timer setting, an aspect ratio setting, an image capturing mode setting, or an image effects setting.

19. The method of claim 9, wherein a size of the control objects changes based on a change in size of the area.

20. A non-transitory computer readable medium storing programming instructions which, when executed by a processor of an electronic device including a flexible display in which a size of an area visible at a front of a housing changes between a retracted position and an extended position of the housing, cause the electronic device to:
display an image obtained via a camera of the electronic device in at least a part of the area of the flexible display;
in response to detecting a reduction in the size of the area of the flexible display, compare the reduced size of the area of the flexible display to a size of the image;
based on a result of the comparing, identify whether an entirety of the image is displayable in the reduced area of the flexible display;
in response to determining that the entirety of the image is displayable in the reduced area of the flexible display, display the image in the reduced area of the flexible display while maintaining an aspect ratio and the size of the image, wherein control objects related to the camera at least partially overlap the image displayed in the reduced area of the flexible display; and in response to determining that the entirety of the image is not displayable in the reduced area of the flexible display, display a part of the image in the reduced area of the flexible display while maintaining the aspect ratio and the size of the image or a reduced image in the reduced area of the flexible display.

* * * * *